US005760637A

United States Patent [19]
Wong et al.

[11] Patent Number: 5,760,637
[45] Date of Patent: Jun. 2, 1998

[54] PROGRAMMABLE CHARGE PUMP

[75] Inventors: Henry Wong, Sunnyvale; Paul S. Chan, Cupertino; Raymond W. B. Chow, Saratoga, all of Calif.

[73] Assignee: Sipex Corporation, Billerica, Mass.

[21] Appl. No.: 570,558

[22] Filed: Dec. 11, 1995

[51] Int. Cl.⁶ .................................................. H03M 3/07
[52] U.S. Cl. .......................... 327/536; 327/390; 363/60
[58] Field of Search .............................. 327/534, 535, 327/536, 537, 554, 390, 337, 148, 157, 589; 363/60, 63; 307/110; 331/23, 25, 47

[56] References Cited

U.S. PATENT DOCUMENTS

| | | | |
|---|---|---|---|
| 3,470,443 | 9/1969 | Berry et al. | 321/2 |
| 3,731,112 | 5/1973 | Smith | 307/109 |
| 3,878,450 | 4/1975 | Greatbatch | 321/15 |
| 3,942,047 | 3/1976 | Buchanan | 307/297 |
| 3,943,428 | 3/1976 | Whidden | 321/15 |
| 3,955,353 | 5/1976 | Astle | 58/23 BA |
| 3,975,671 | 8/1976 | Stoll | 321/15 |
| 4,047,091 | 9/1977 | Hutchines et al. | 363/59 |
| 4,061,929 | 12/1977 | Asano | 307/246 |
| 4,068,295 | 1/1978 | Portmann | 363/60 |
| 4,106,086 | 8/1978 | Holbrook et al. | 363/60 |
| 4,186,436 | 1/1980 | Ishiwatari | 363/60 |
| 4,321,661 | 3/1982 | Sano | 363/60 |
| 4,460,952 | 7/1984 | Risinger | 363/61 |
| 4,485,433 | 11/1984 | Topich | 363/60 |
| 4,527,277 | 7/1985 | Kosaka et al. | 375/82 |
| 4,547,682 | 10/1985 | Bialas, Jr. et al. | 307/297 |
| 4,596,963 | 6/1986 | Lawton et al. | 331/14 |
| 4,636,930 | 1/1987 | Bingham et al. | 363/60 |
| 4,679,134 | 7/1987 | Bingham et al. | 363/61 |
| 4,736,167 | 4/1988 | Kojima et al. | 331/17 |
| 4,745,372 | 5/1988 | Miwa | 331/8 |
| 4,750,193 | 6/1988 | Bailey | 375/81 |
| 4,766,397 | 8/1988 | Adams | 331/1 A |
| 4,777,577 | 10/1988 | Bingham et al. | 363/60 |
| 4,797,899 | 1/1989 | Fuller et al. | 375/7 |
| 4,807,104 | 2/1989 | Floyd et al. | 363/59 |
| 4,809,152 | 2/1989 | Bingham et al. | 363/61 |
| 4,829,391 | 5/1989 | Vargas, Jr. | 360/51 |
| 4,871,979 | 10/1989 | Shearer et al. | 330/253 |
| 4,897,774 | 1/1990 | Bingham et al. | 363/61 |
| 4,914,695 | 4/1990 | Martin | 380/7 |
| 4,922,141 | 5/1990 | Lofgren et al. | 307/595 |
| 4,970,472 | 11/1990 | Kennedy et al. | 331/8 |
| 4,970,475 | 11/1990 | Gillig | 331/25 |
| 4,999,761 | 3/1991 | Bingham et al. | 363/60 |
| 5,003,197 | 3/1991 | Nojima et al. | 307/296.2 |
| 5,008,629 | 4/1991 | Ohba et al. | 328/14 |
| 5,043,686 | 8/1991 | Plunkett | 333/181 |
| 5,051,882 | 9/1991 | Grimm et al. | 363/60 |
| 5,095,223 | 3/1992 | Thomas | 307/110 |
| 5,237,209 | 8/1993 | Brewer | 307/110 |
| 5,262,934 | 11/1993 | Price | 363/60 |
| 5,301,097 | 4/1994 | McDaniel | 363/60 |
| 5,397,928 | 3/1995 | Chan et al. | 307/109 |
| 5,532,915 | 7/1996 | Pantelakis et al. | 363/60 |

OTHER PUBLICATIONS

Wakeman, Larry, "National's Process Enhancements Eliminate the CMOS SCR Latch–Up Problem in 56HC/74HC Logic." *National Semiconductor Application Note 339*, pp. 2–43 through 2–50, undated.

*Primary Examiner*—Timothy P. Callahan
*Assistant Examiner*—My-Trang Nu Ton
*Attorney, Agent, or Firm*—Testa, Hurwitz & Thibeault, LLP

[57] ABSTRACT

A programmable charge pump produces a selected one of a plurality of bipolar output voltages in response to a pump select input signal. Transistor switches in the charge pump are controlled by logic circuitry so as to provide the selected bipolar output voltages. The charge pump may include a power management circuit to optimize power consumption by varying the clock frequency based on the current being drawn by the load. The charge pump may be fabricated as an integrated circuit which supports a plurality of interface standards requiring different bipolar supply voltages.

27 Claims, 26 Drawing Sheets

A) SYMMETRICAL +/-10V CHARGE PUMP

B) ASYMMETRICAL +/-5V PUMP (WITH CONTINUOUS VSS PUMPING)

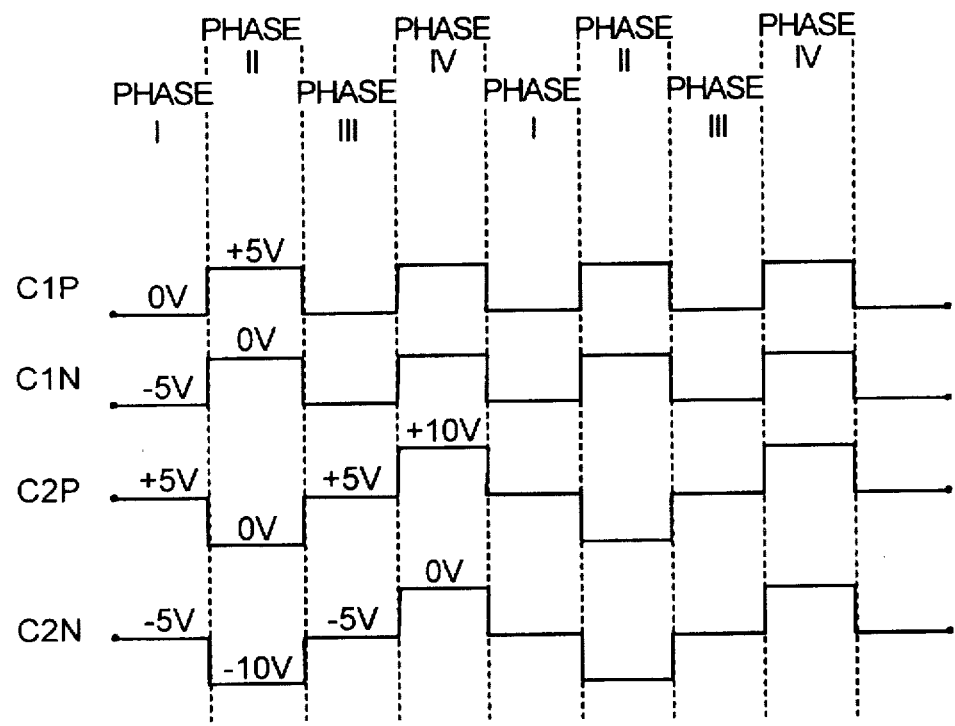
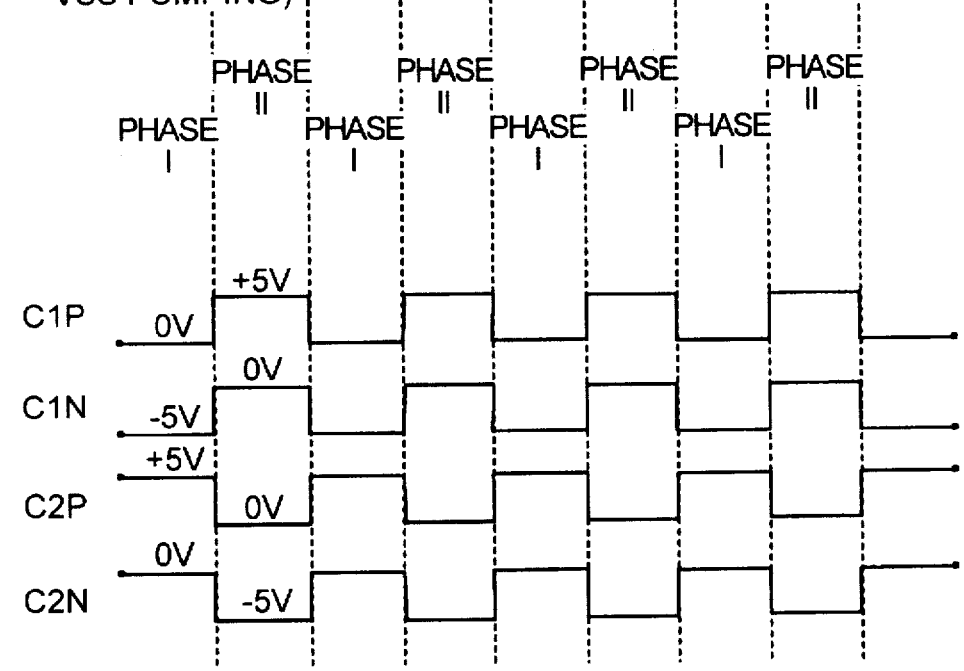
FIG. 5a

PROGRAMMABLE CHARGE PUMP

FIELD OF THE INVENTION

This invention relates to computer interface devices, and more particularly to a programmable charge pump.

BACKGROUND OF THE INVENTION

The use of charge pumps to multiply an input supply voltage or to invert an input supply voltage is well known in the art. In one charge pump circuit three capacitors are employed with a two phase clock. All three capacitors are charged to the voltage of the input voltage source in the first phase. In the second phase one capacitor is switched in series with the voltage source to provide a positive voltage approximately twice the input voltage. A positive storage capacitor is charged to the doubled positive voltage. Also in the second phase, the other two capacitors are connected in series with the positive terminal of one of the capacitors connected to the negative terminal of the other capacitor. The most positive terminal of the series pair of capacitors is connected to the negative connection of the input voltage source (ground) so as to provide a substantially doubled inverted voltage. The doubled inverted voltage is employed to charge a negative storage capacitor to the doubled inverted voltage thereby providing a bipolar voltage approximately twice the input voltage.

In recent years a number of communication interface standards have been adopted. The standards do not all employ the same voltages for drivers and receivers. Additionally, with the increasing desire to integrate more functionality within an integrated circuit, there has been a tendency to combine communication interfaces within a common integrated circuit. For example the Electronic Industries Association (EIA) RS232 and the RS423 standards have been widely employed for electronic communication of data. The RS232 interface requires bipolar supply voltages of approximately ±10V and the RS423 interface requires bipolar supply voltages of approximately ±5V for the respective drivers and receivers. When communication interfaces are combined within a single integrated circuit or on a single printed circuit board, based upon the communication circuits employed a need may therefore exist for a source of more than one bipolar supply voltage to provide the needed voltages for the respective drivers and receivers. For this, and other applications, it would therefore be desirable to have a charge pump capable of providing multiple bipolar, outputs with the bipolar output selected in response to an input signal.

SUMMARY OF THE INVENTION

In accordance with the present invention a charge pump operates in response to an input signal to provide a predetermined bipolar voltage output selected from a plurality of possible bipolar voltage outputs. The charge pump includes a plurality of switches, a plurality of capacitors, and pump selection circuitry operative to control the switches, and thus control charging of the plurality of capacitors such that a selected bipolar voltage can be provided by the charge pump in response to the input signal.

The presently disclosed charge pump offers cost savings, obviates duplicative circuitry, and allows for reduced die sizes by providing a single programmable charge pump capable of providing more than one bipolar voltage with fewer components. In one embodiment two possible bipolar voltage outputs are provided with two charge capacitors and two storage capacitors. Additionally, when the presently disclosed charge pump is fabricated as an integrated circuit power loss due to current leakage is minimized.

When used in conjunction with a power management circuit, the presently disclosed charge pump optimizes power consumption by varying the clock frequency of the charge pump. The frequency of the charge pump is increased in response to increased loading and thus, power consumption is reduced when the charge pump is lightly loaded.

BRIEF DESCRIPTION OF THE DRAWING

These and other features and advantages of the invention will be more readily understood in view of the accompanying specification and drawings in which.

DETAILED DESCRIPTION OF THE DRAWING

Figure 1:
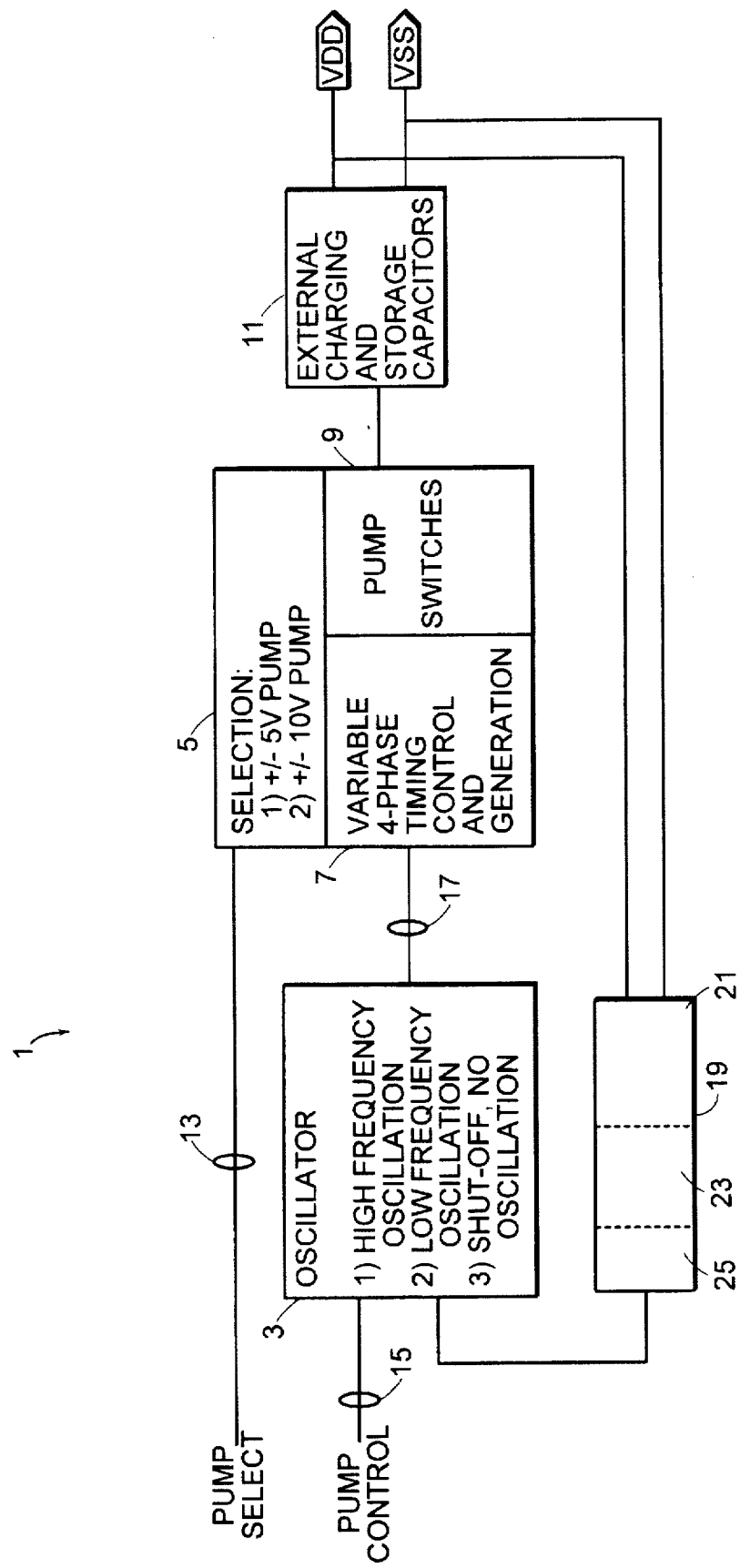
FIG. 1 is a block diagram of a programmable charge pump according to the present invention.

FIG. 1 is a block diagram of a programmable charge pump 1. The charge pump includes an oscillator 3, pump configuration circuitry 5, timing control circuitry 7, pump switches 9, external capacitors 11, and a power management circuit 19. The charge pump 1 outputs bipolar voltages of $V_{DD}$ and $V_{SS}$. The pump select signal 13 is received in the pump configuration circuitry 5 (which includes logic circuitry implementable by any of various techniques known in the art). The pump control signal 15 is received in the oscillator 3. The oscillator circuitry is in communication with the timing control 7, and provides a signal 17 to the timing control circuitry. The pump switches 9 are selectably connectable to the external capacitors 11 in the manner hereinafter described.

The charge pump 1 operates in response to the pump select signal 13 to provide a bipolar output voltage. In the embodiment herein described, the charge pump 1 provides either ±5 Volts (+$V_{CC}$ and $V_{CC}$) or ±10 Volts (+2 $V_{CC}$ and 2 $V_{CC}$), selectable via the pump select signal 13. The logic within the pump configuration circuitry 5 is operative to control particular, the switches 9 selectably interconnect capacitors 11 to provide predetermined bipolar output voltages at nodes $V_{DD}$ and $V_{SS}$. The timing control circuitry 7 uses the signal 17 from the oscillator 3 to provide timing control for switch manipulation. The pump select signal 13 may be a one bit digital signal capable of selecting one of two possible bipolar output voltages. Alternatively, a multi-bit digital signal may be employed in the event that it is desirable to provide more than two bipolar output voltages.

The power management circuit 19 includes a frequency controller 21, an oscillator 23 and a voltage conditioning circuit 25. The power management circuit 19 may be used to vary clock frequency supplied to the timing control circuitry 7 to optimize power consumption. The purpose of the power management circuit 19 is to vary oscillator frequency, and hence the clock frequency at which the charge pump 1 operates. As the voltage $V_{DD}$ decreases below a prescribed voltage level due to increased loading, the power management circuit 19 detects the drop in voltage at $V_{DD}$ and causes the oscillator 3 to increase output frequency to compensate for the voltage drop. As voltage at $V_{DD}$ increases above a prescribed voltage level, the power management circuit 19 causes the oscillator 3 to decrease output frequency. In this way the power consumed by the charge pump 1 is reduced when the charge pump 1 is lightly loaded.

Figure 2:
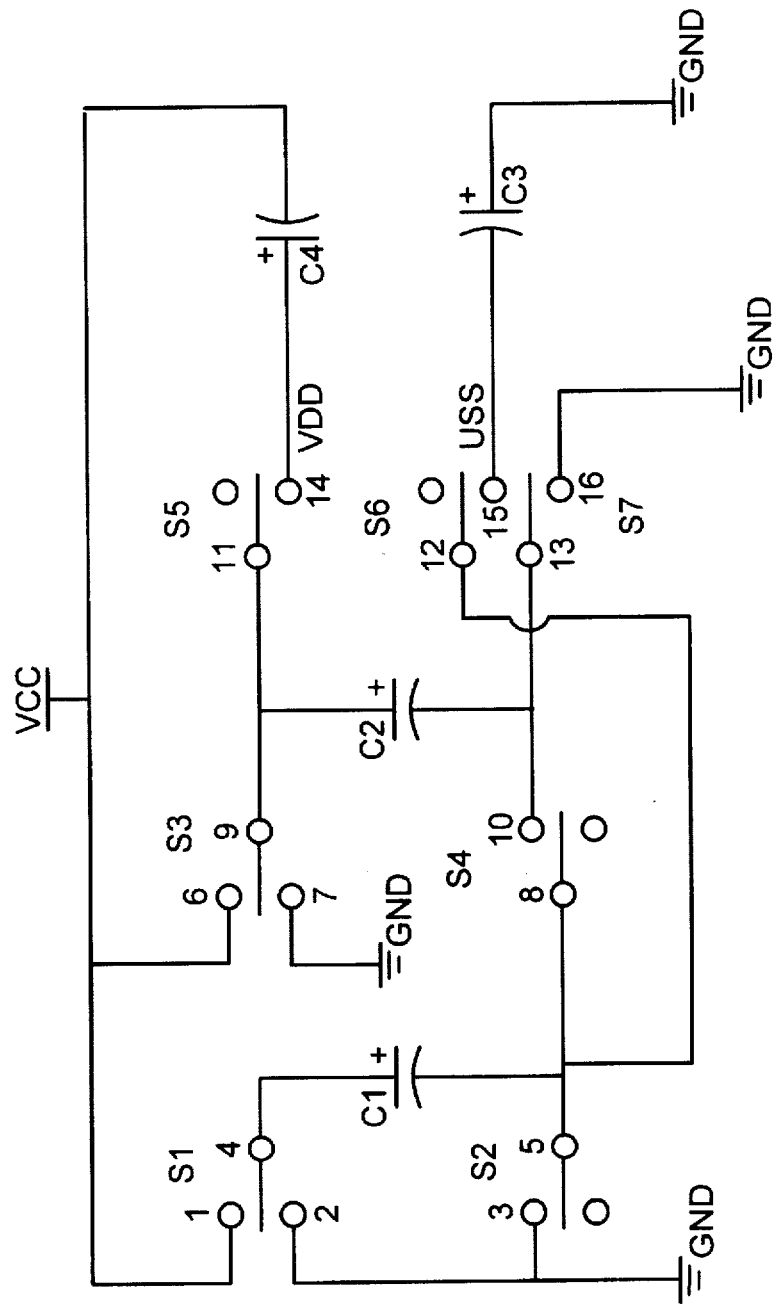
FIG. 2 is a schematic representation of the switches and capacitors of FIG. 1.

FIG. 2 illustrates the switches 9 and capacitors 11 of FIG. 1. Included are four capacitors C1-C4 and seven switches S1-S7. Sixteen nodes N1-N16 are associated with the switches. Capacitors C1 and C2 function as charge capacitors and capacitors C3 and C4 function as storage capacitors. The more positive terminals of the capacitors C1-C4 in operation, as indicated in FIG. 2, are herein referred to as C1+, C2+ etc., while the more negative terminals of the capacitors C1-C4 are referred to respectively as C1-, C2- etc. The switches S1-S7 are operative in response to the pump configuration circuitry 5, and are implemented with transistors. More specifically, the switches S1-S7 and capacitors C1-C4 are connected in a manner so as to permit selectable pumping.

Figure 3:
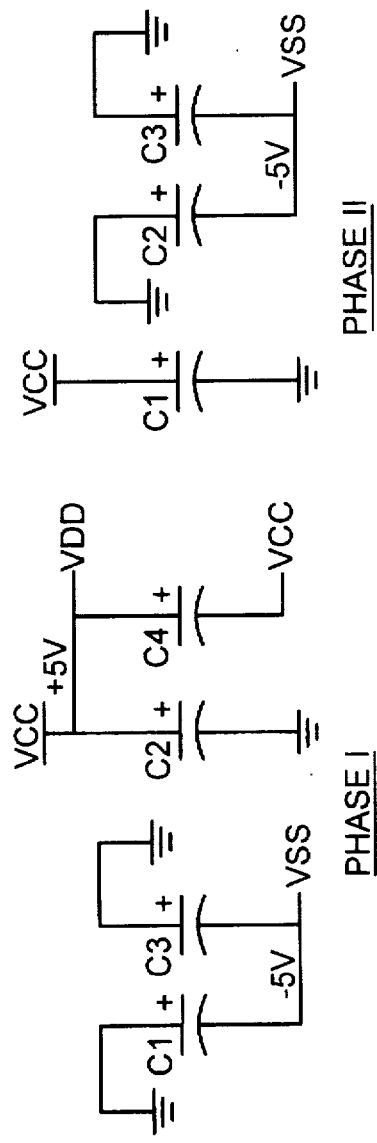
FIG. 3 is a diagram of the switches and capacitors of FIG. 2 showing asymmetrical ±5 Volt operation.

Referring now to FIGS. 2 and 3, the ±5 volt mode has two phases. In the first phase, $V_{SS}$ storage capacitor C3 is charged with charge capacitor C1, and charge capacitor C2 is charged between $V_{CC}$ and GND. That is, C1+ is connected to GND, C1- is connected to C3-, C3+ is connected to GND, C2+ is connected to $V_{CC}$, C2- is connected to GND, C4+ is connected to $V_{CC}$ and C4- is connected to $V_{CC}$. The first phase is accomplished by switchably connecting node N4 to N2 in S1, N12 to N15 in S6, N9 to N6 in S3, N13 to N16 in S7, and N11 in S5.

In the second phase of operation $V_{SS}$ storage capacitor C3 is charged by charge capacitor C2 while charge capacitor C1 is charged between $V_{CC}$ and GND. That is, C1+ is connected to $V_{CC}$, C1- is connected to GND, C2+ is connected to GND, C2- is connected to C3-, and C3+ is connected to GND. The second phase is accomplished by switchably connecting node N4 to N1 in S1, N5 to N3 in S2, N9 to N7 in S3, and N13 to N15 in S7. Since the first and second phases of operation are repeated, it will be appreciated that $V_{SS}$ storage capacitor C3 experiences charging in the first and second phases while $V_{DD}$ is provided by switchably connecting $V_{CC}$ to $V_{DD}$ in the first phase.

Figure 4:
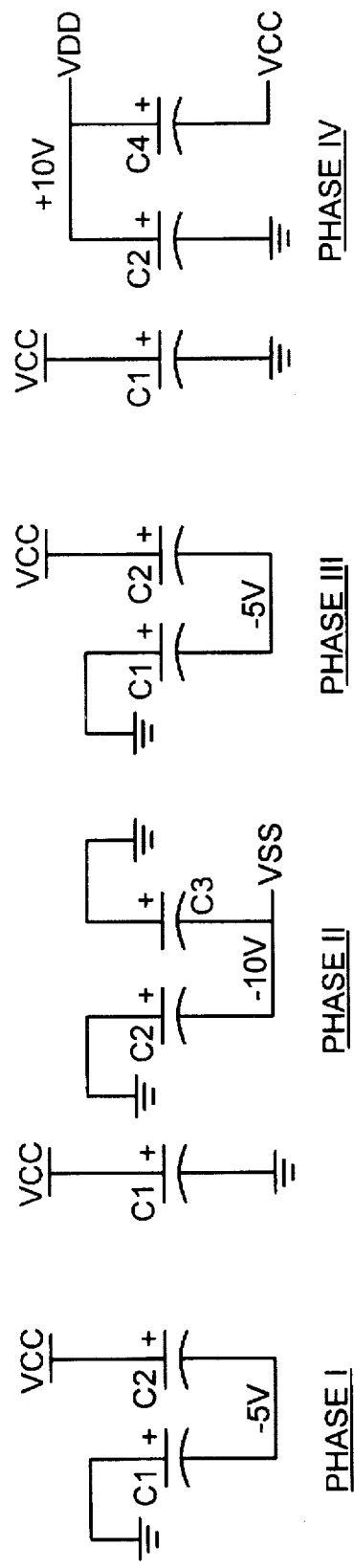
FIG. 4 is a diagram of the switches and capacitors of FIG. 2 in symmetrical ±10 Volt operation.

Referring now to FIGS. 2 and 4, the ±10 Volt mode has four phases. In the first phase charge capacitor C1 is employed to charge capacitor C2, so as to provide a +10 Volt charge on C2. That is, C1+ is connected to GND, C1- is connected to C2-, and C2+ is connected to $V_{CC}$. The first phase is accomplished by switchably connecting node N2 to N4 in S1, connecting node N6 to N9, in S3,and connecting node N8 to N10 in S4.

In the second phase charge capacitor C1 is charged between $V_{CC}$ and GND while charge capacitor C2 is employed to charge $V_{SS}$ storage capacitor C3. That is, C1+ is connected to $V_{CC}$, C1- is connected to GND, C2+ is connected to GND, C2- is connected to C3-, and C3- is connected to GND. The generated -10 Volts across C2 is thus transferred to storage capacitor C3. The second phase is accomplished by switchably connecting node N1 to N4 in S1, node N3 to N5 in S2, node N9 to N7 in S3, and node N13 to N15 in S7.

In the third phase, as in the first, charge capacitor C1 is employed to charge capacitor C2 so as to provide +10 volts across C2. That is, C1+ is connected to GND, C1- is connected to C2-, and C2+ is connected to $V_{CC}$. The third phase is accomplished by switchably connecting node N2 to N4 in S1, connecting node N6 to N9 in S3, and connected node N8 to N10 in S4.

In the fourth phase charge capacitor C1 is charged between $V_{CC}$ and GND while charge capacitor C2 is employed to charge the $V_{DD}$ storage capacitor C4 to $V_{DD}$. That is, C1+ is connected to $V_{CC}$, C1- is connected to GND, C2+ is connected to $V_{DD}$ and C2- is connected to GND. This is accomplished by switchably connecting node N1 to N4 in S1, node N5 to N3 in S2, node N11 to N14 in S5, and node N13 to N16 in S7. The above described phases are sequentially repeated. Since both $V_{DD}$ and $V_{SS}$ are separately generated from $V_{CC}$ in a non-load condition, $V_{DD}$ and $V_{CC}$ are symmetrical.

Figure 5B:
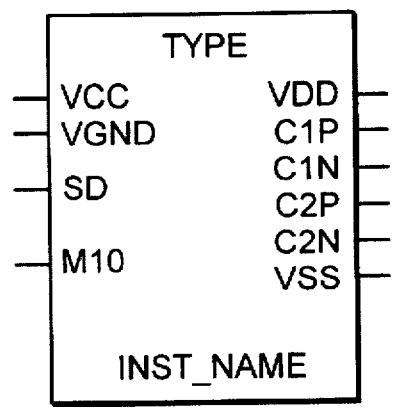
FIGS. 5a–5cc comprise the schematic and timing diagrams for a preferred embodiment of the programmable charge pump of FIG. 1.
Figure 5C:
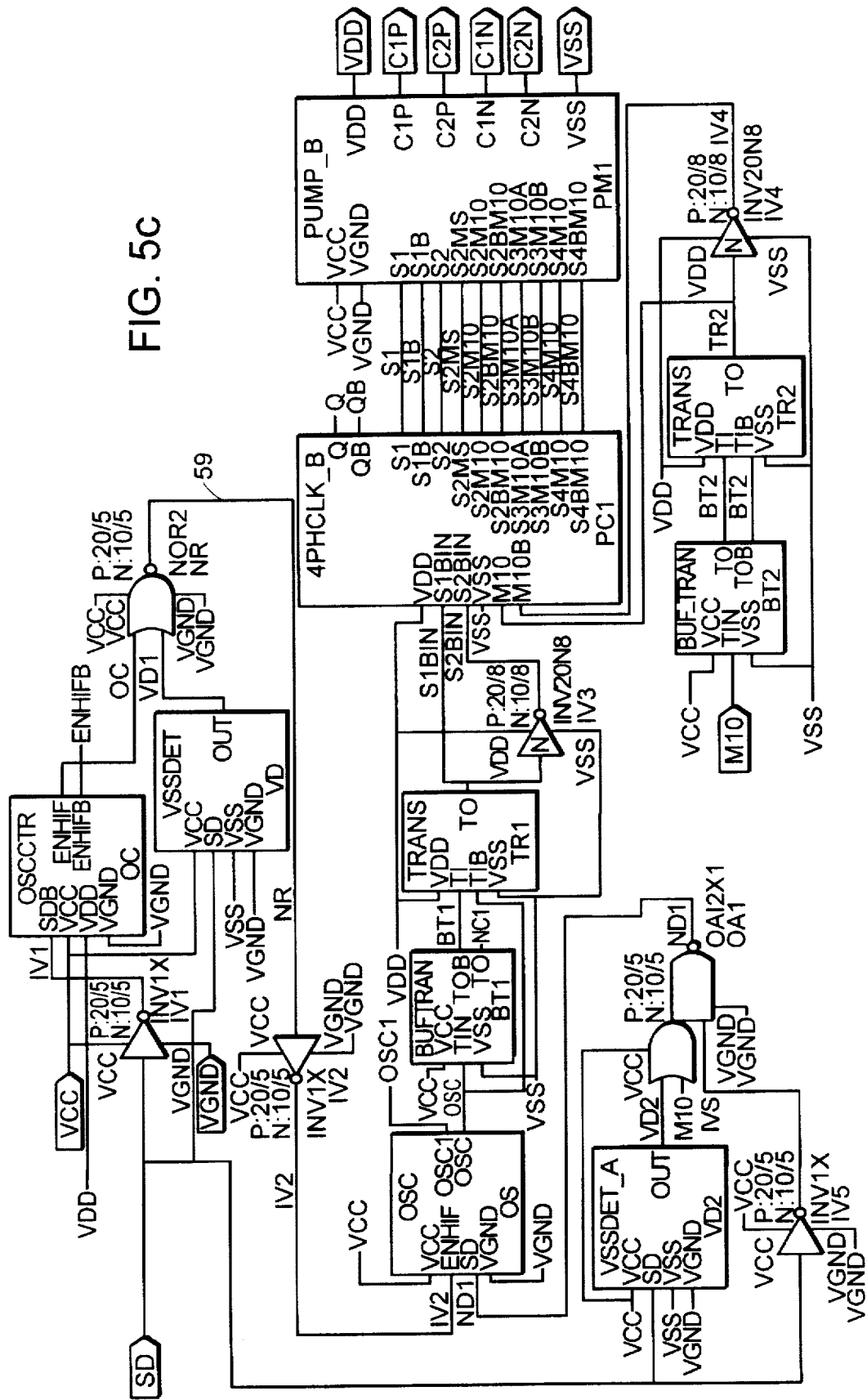
Figure 5D:
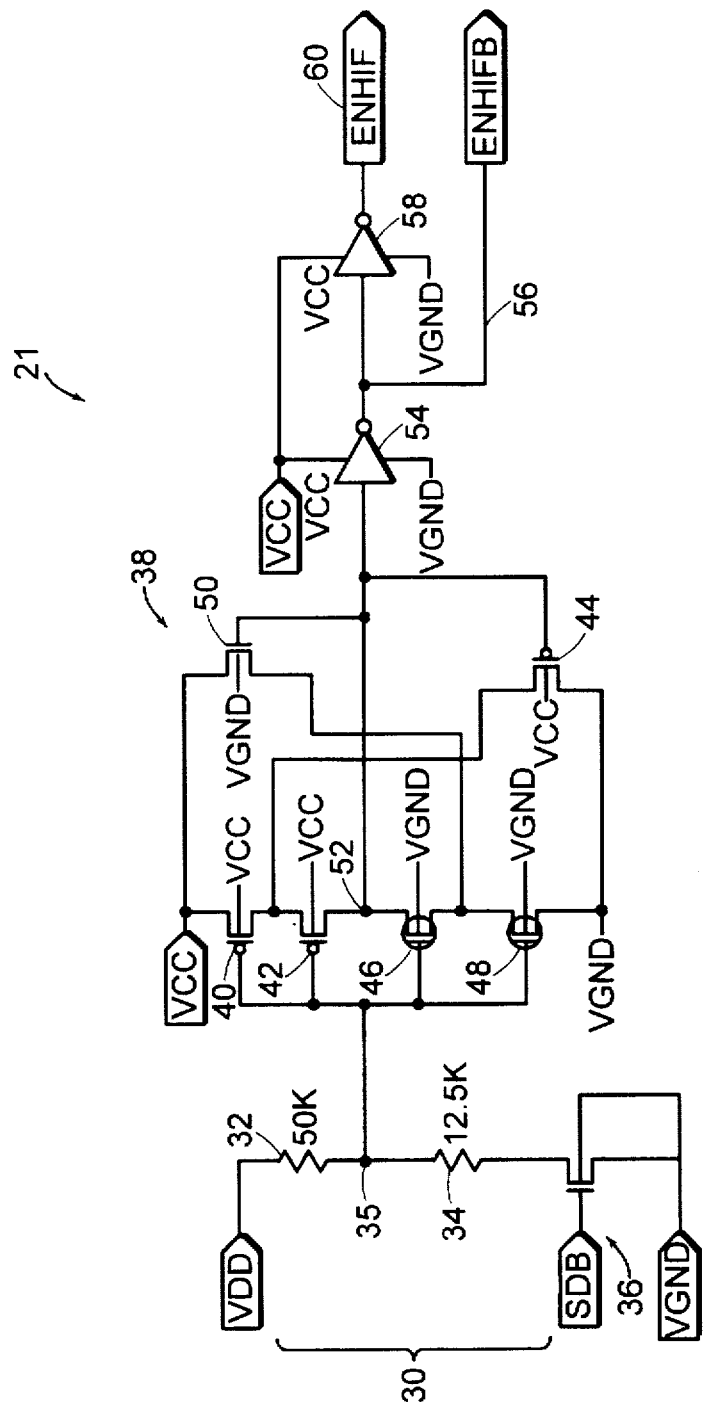
Figure 5E:
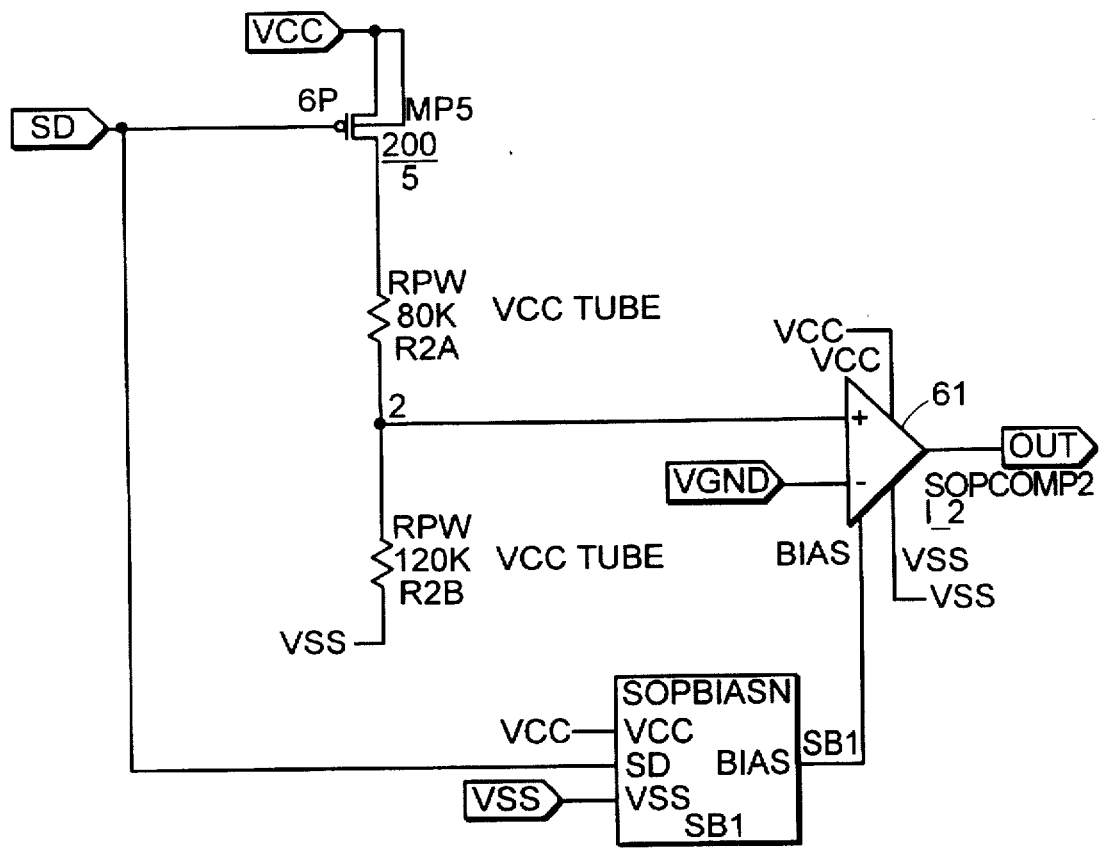
Figure 5F:
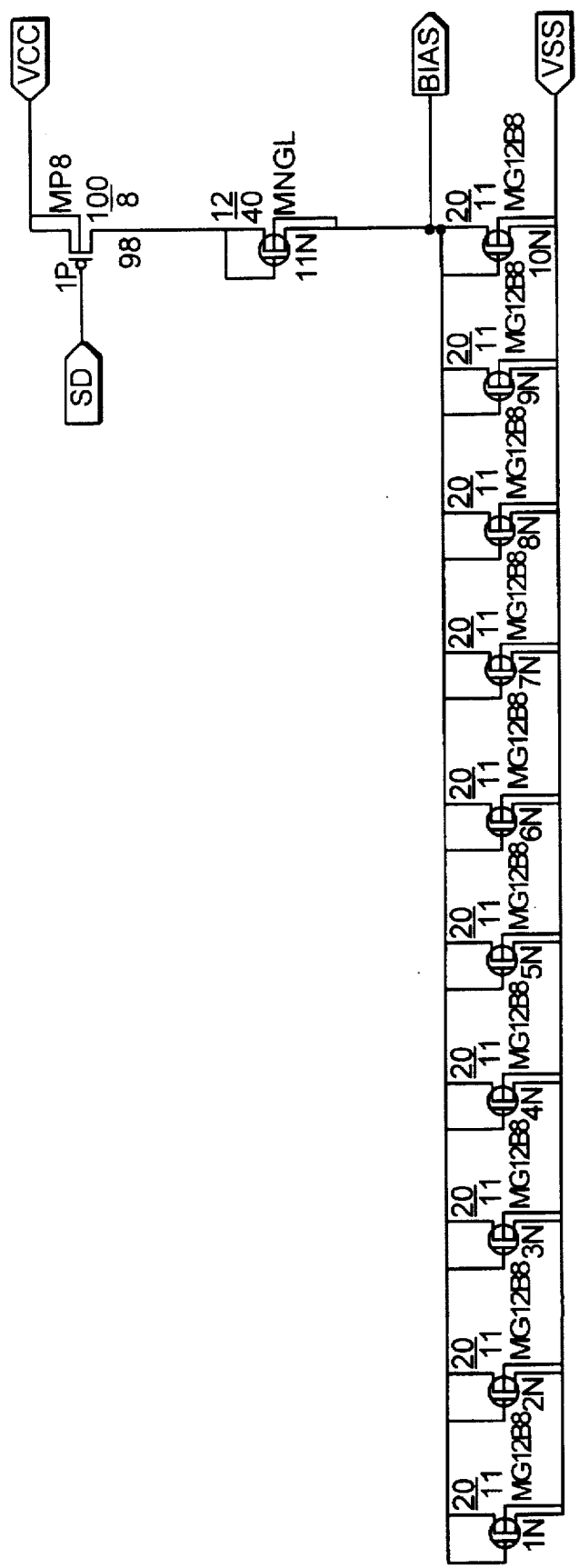
Figure 5G:
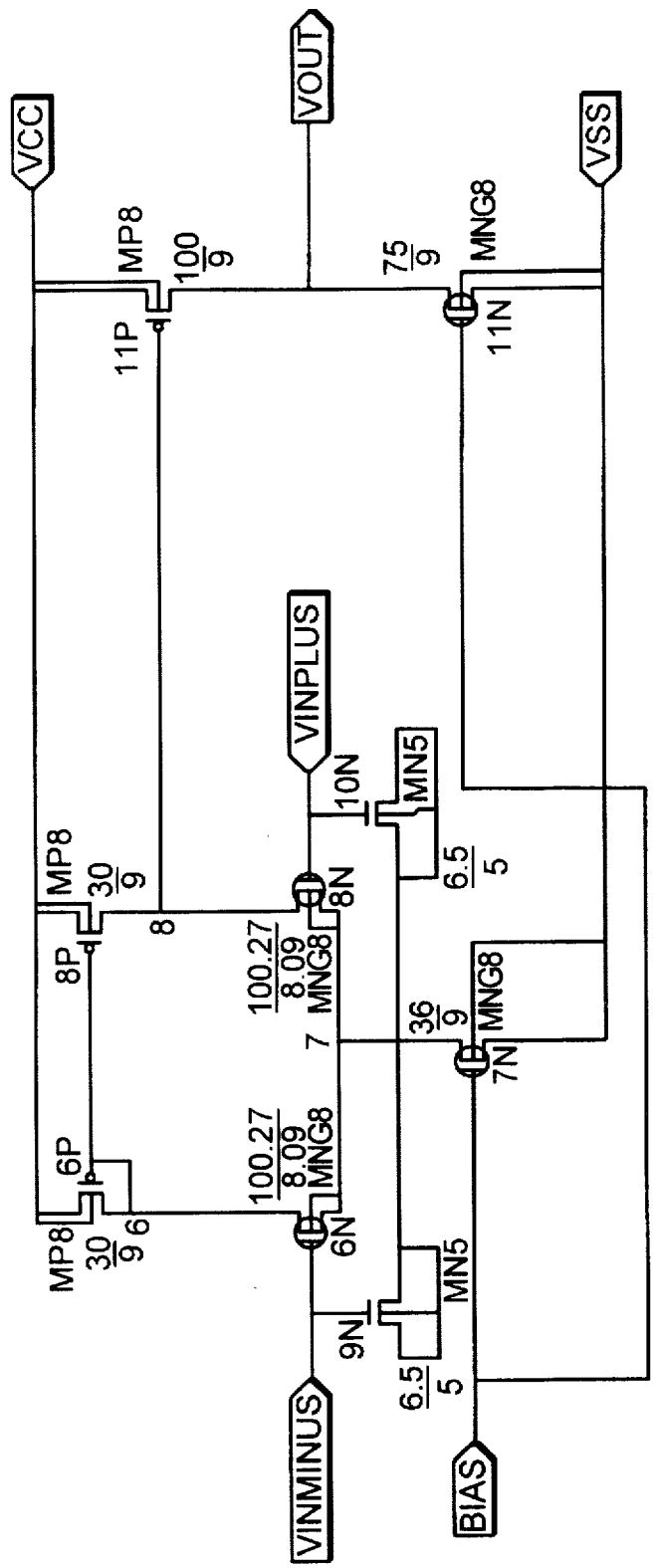
Figure 5H:
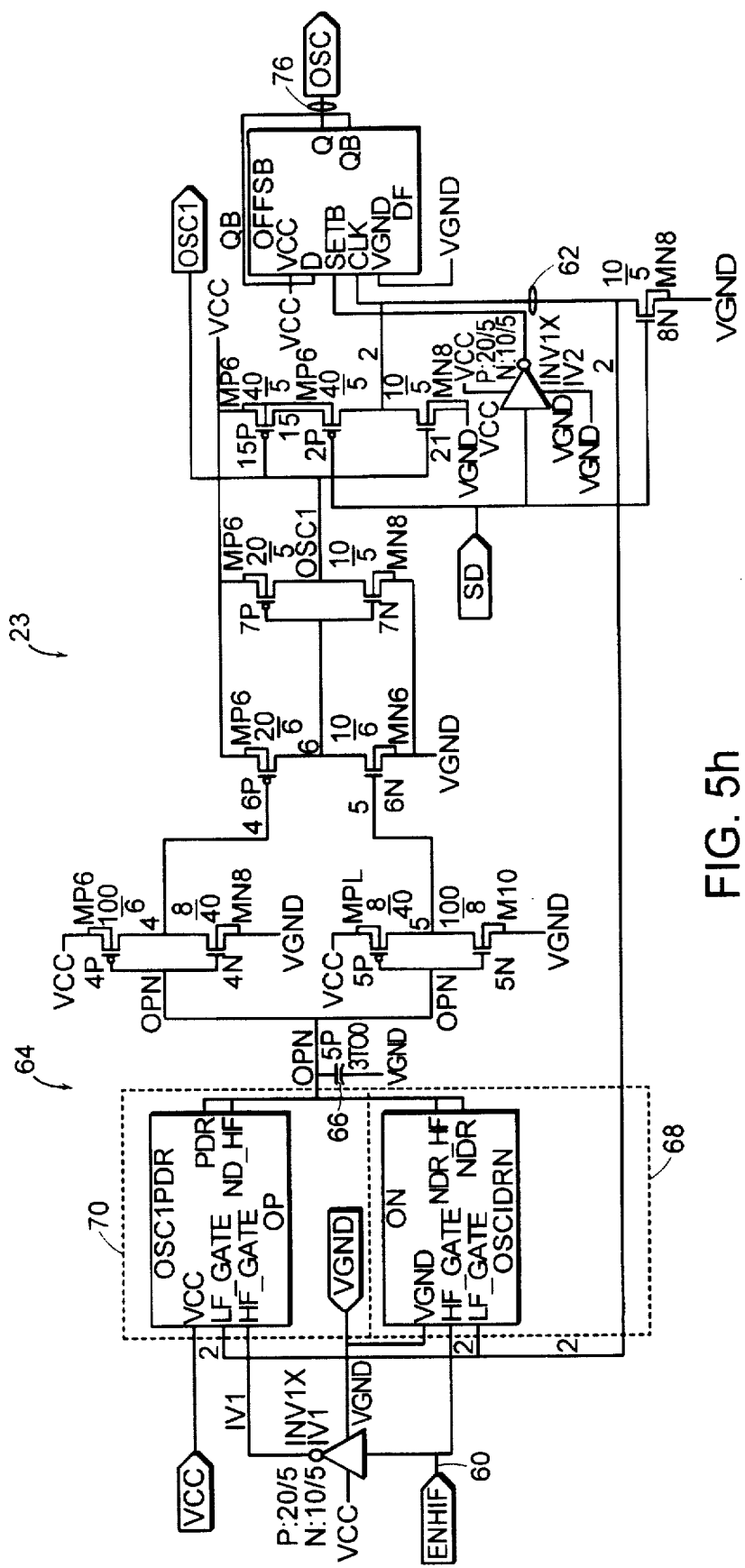
Figure 5I:
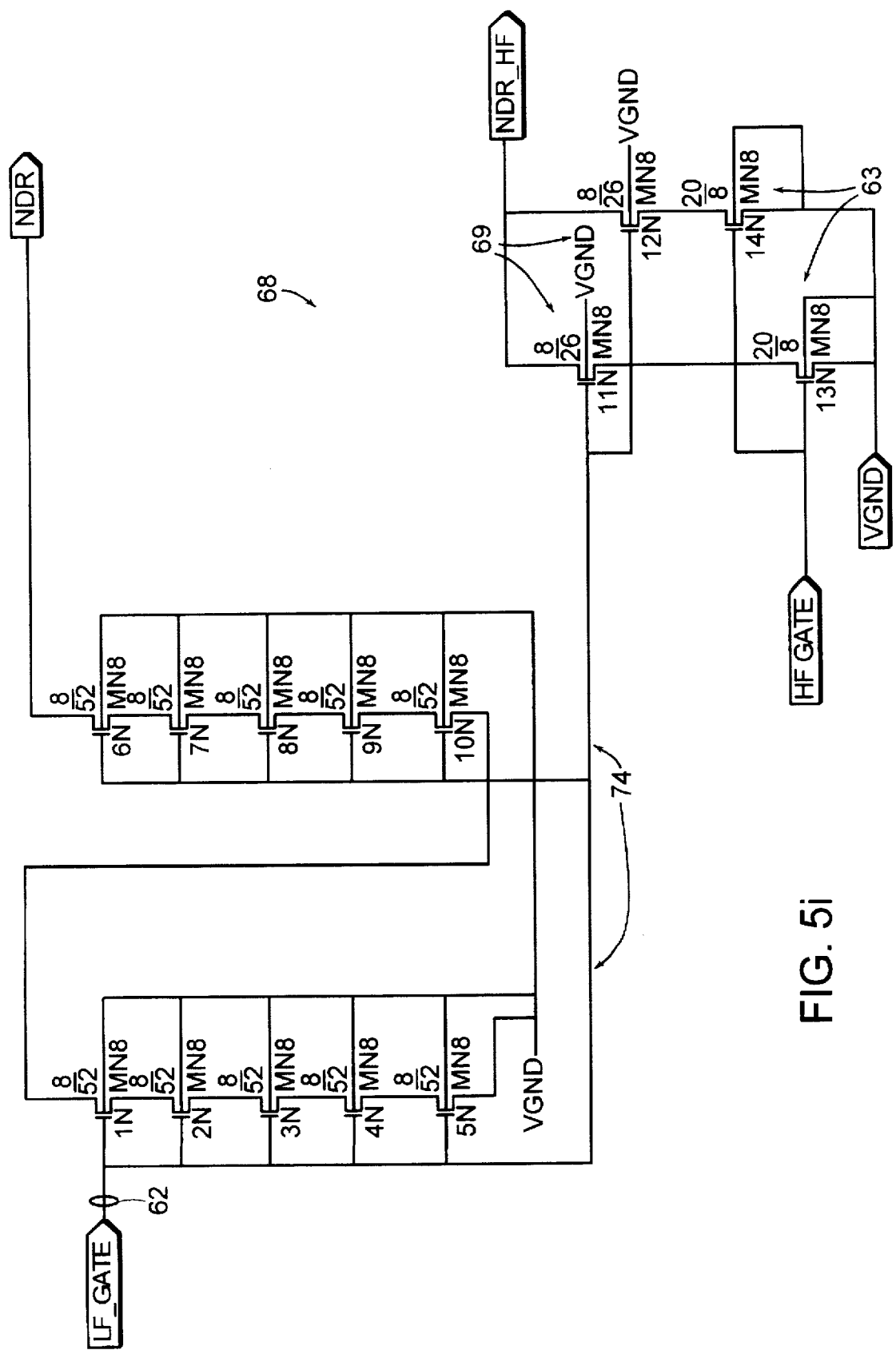
Figure 5J:
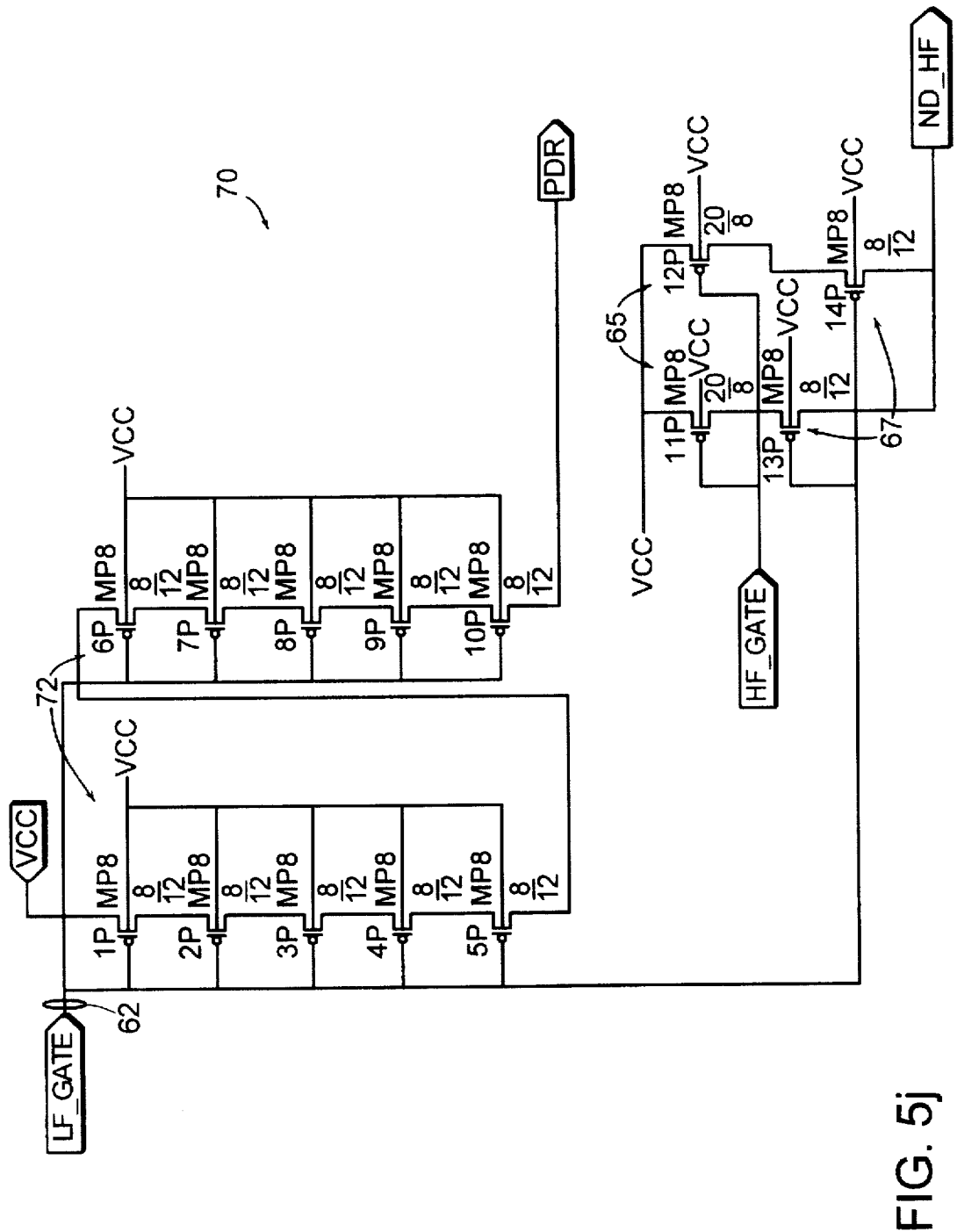
Figure 5K:
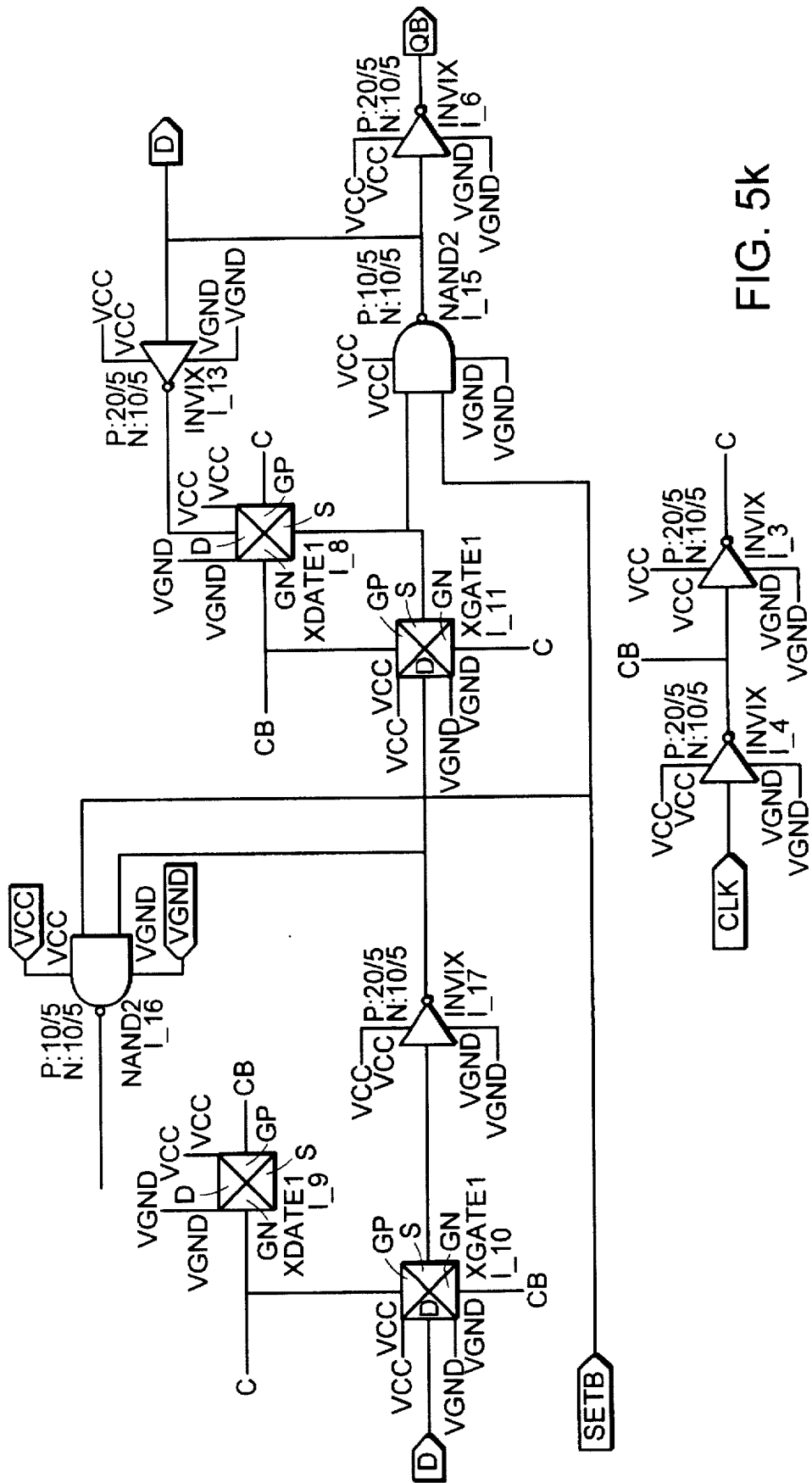
Figure 51:
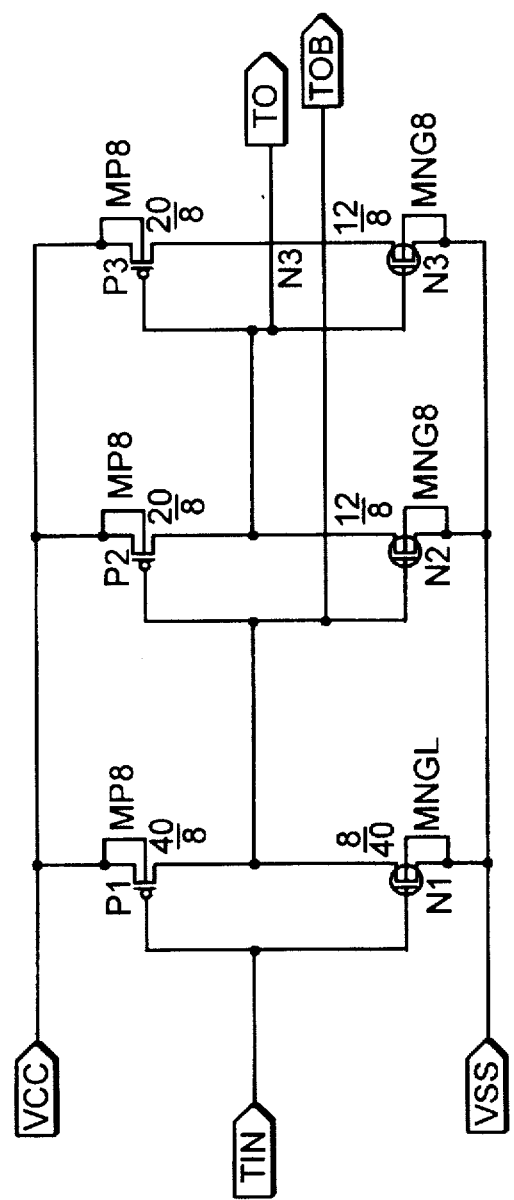
Figure 5M:
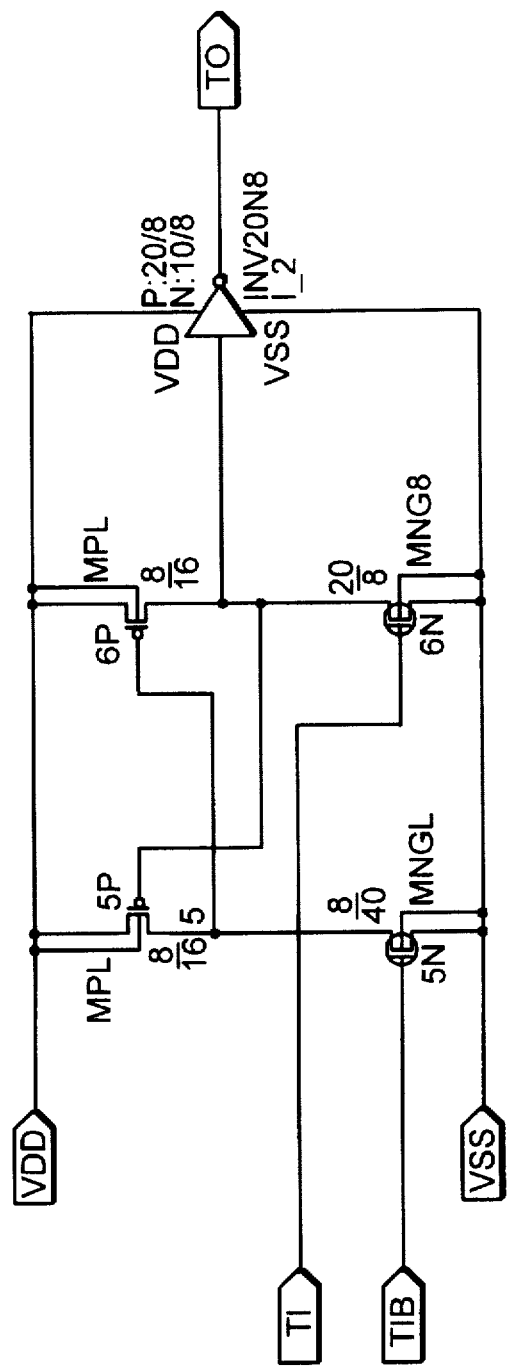
Figure 5N:
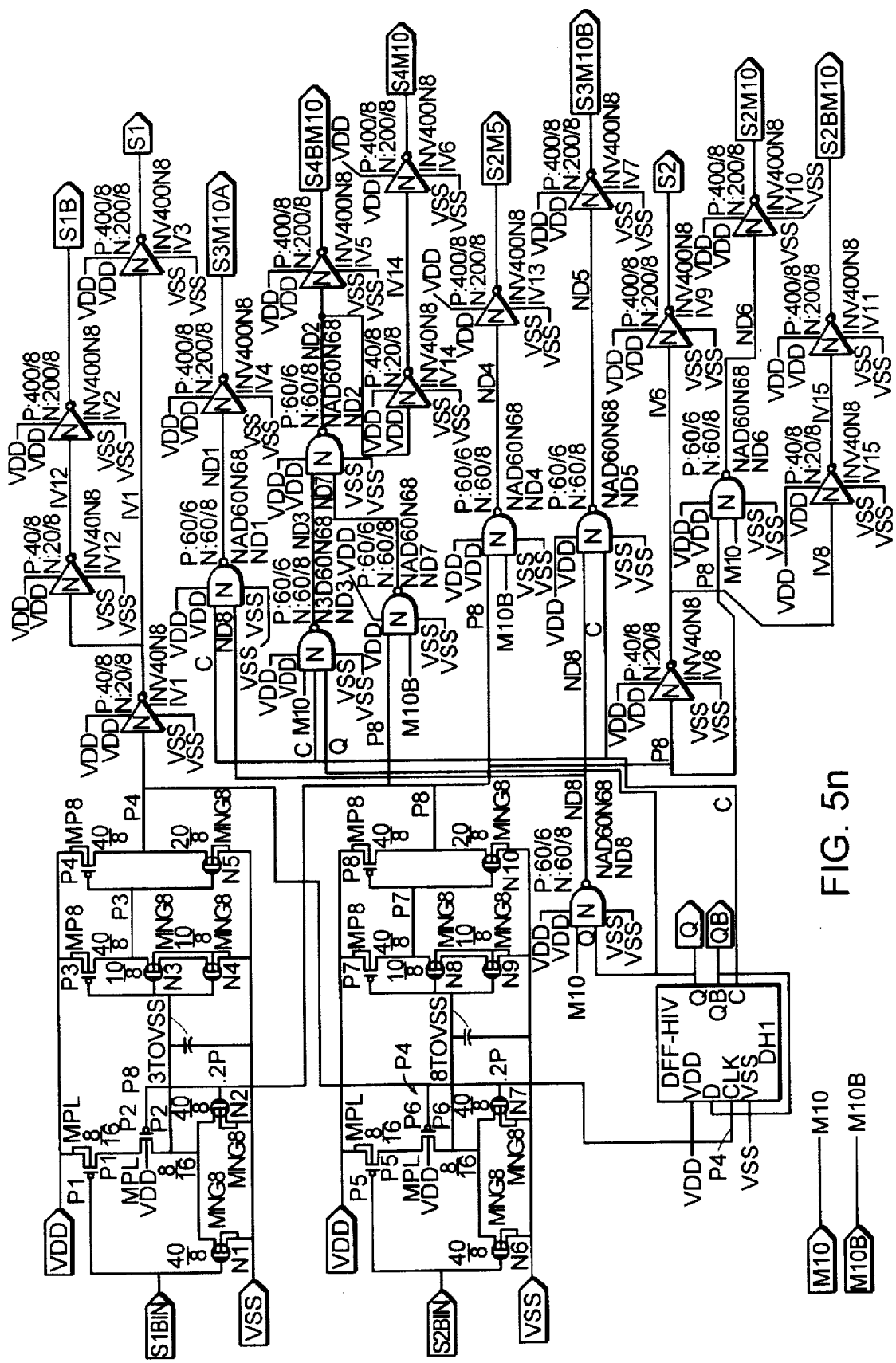
Figure 50:
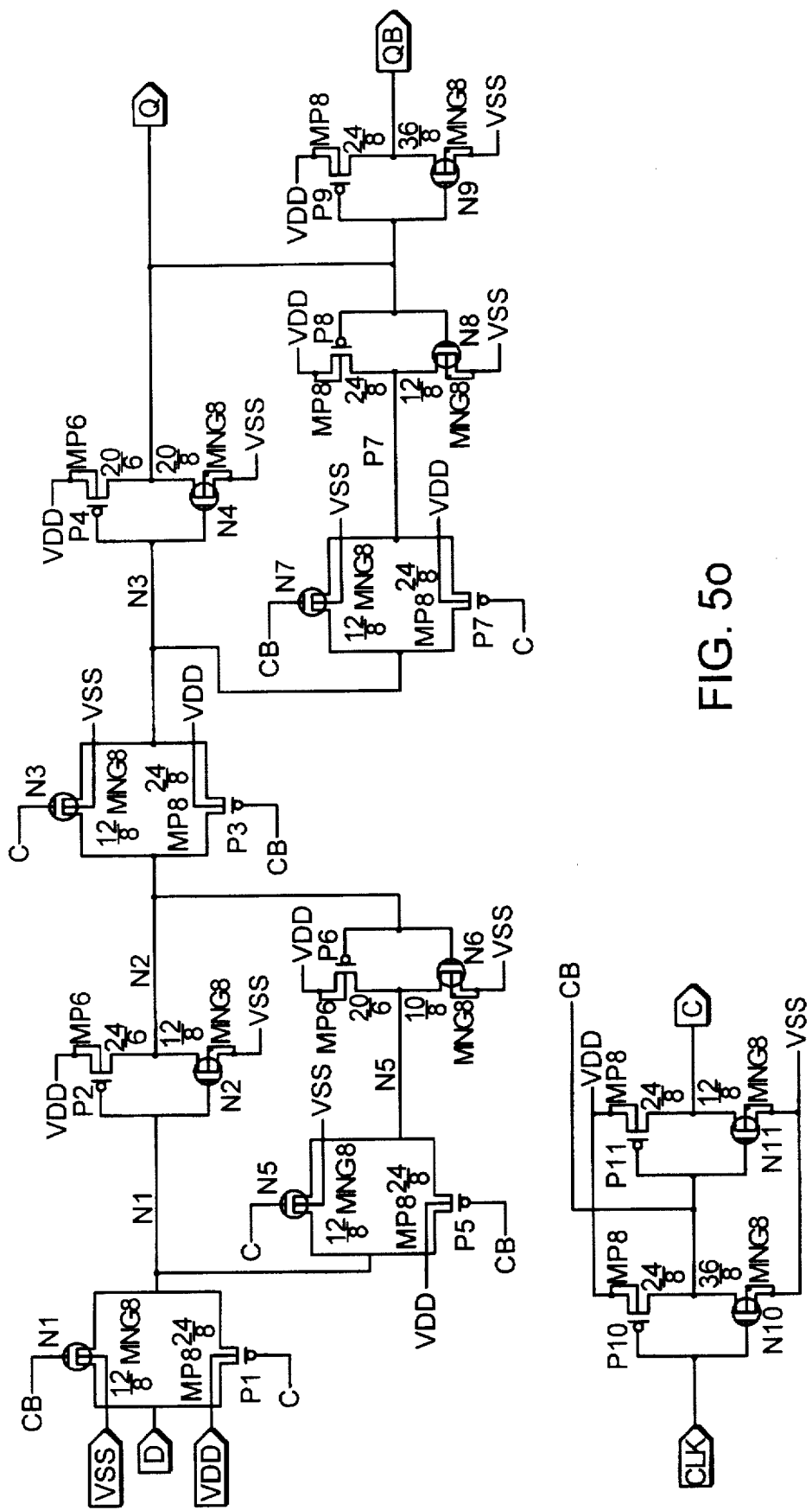
Figure 5P:
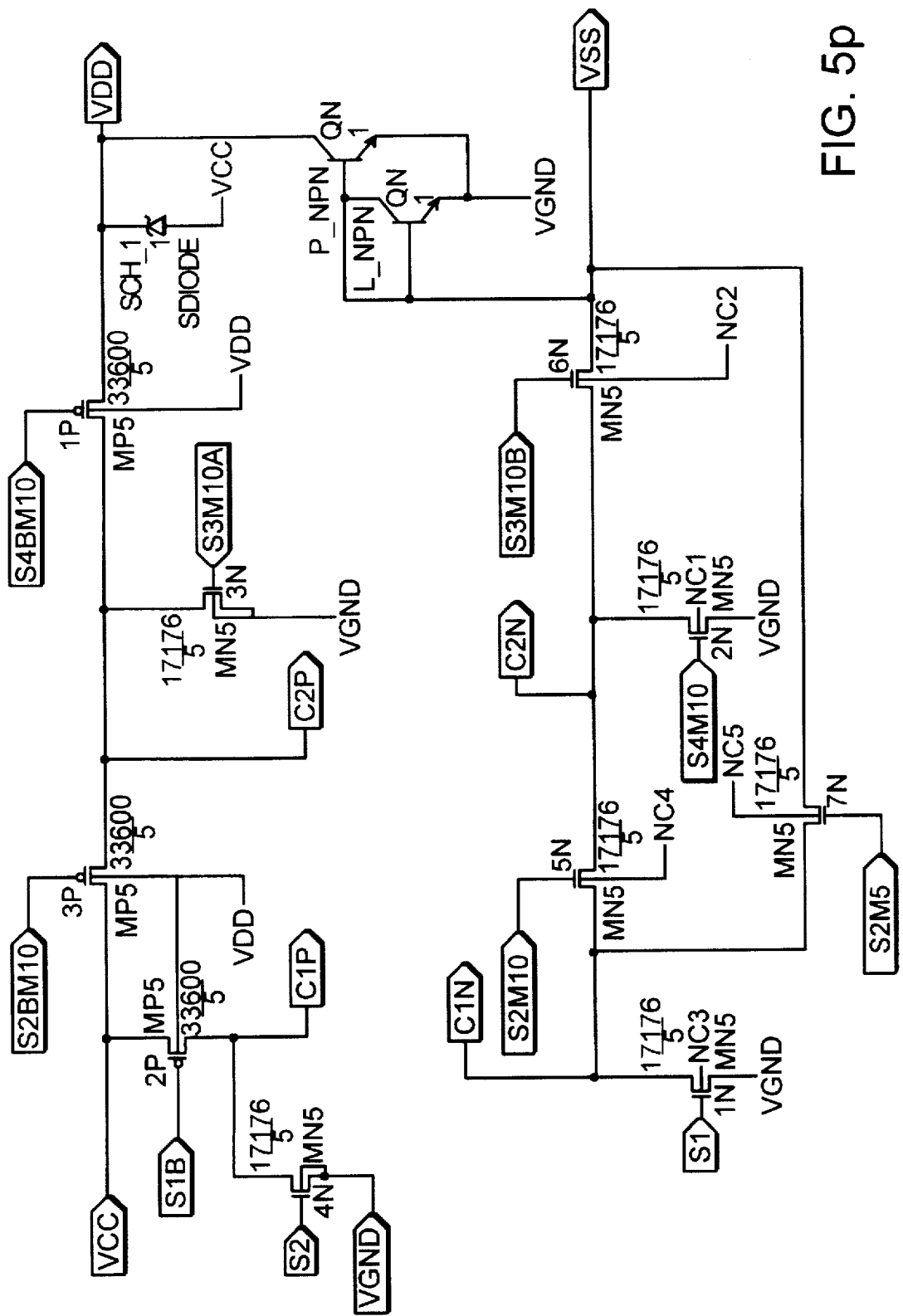
Figure 5Q:
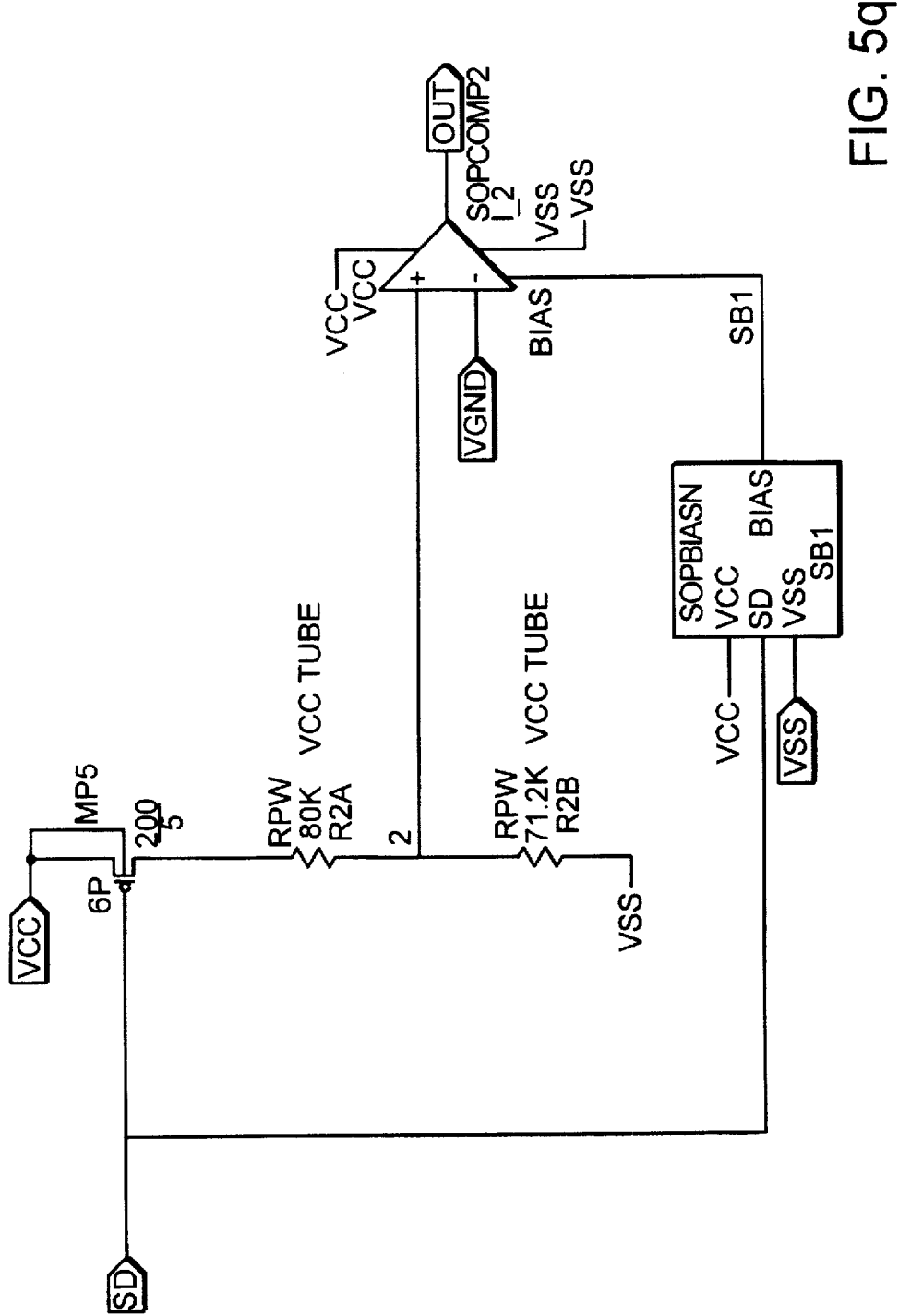
Figure 5R:
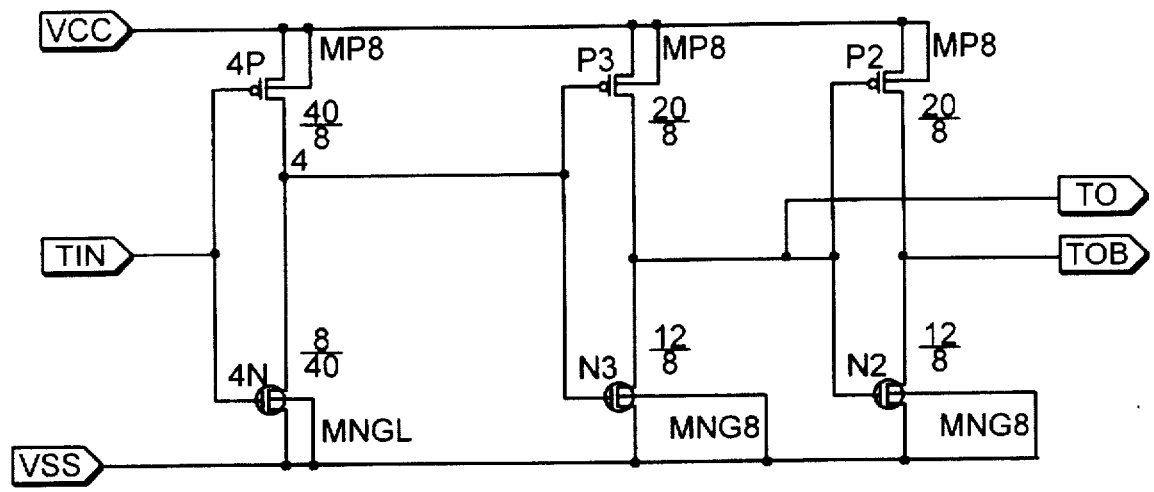
Figure 5S:
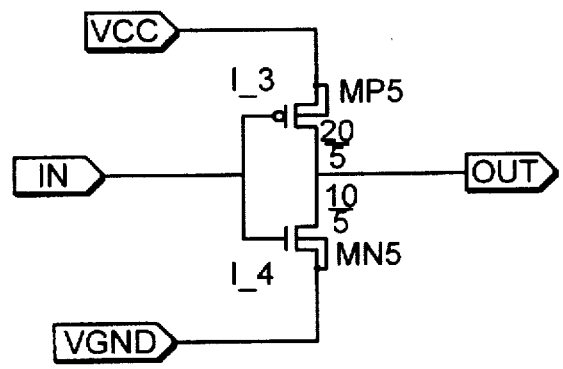
Figure 5T:
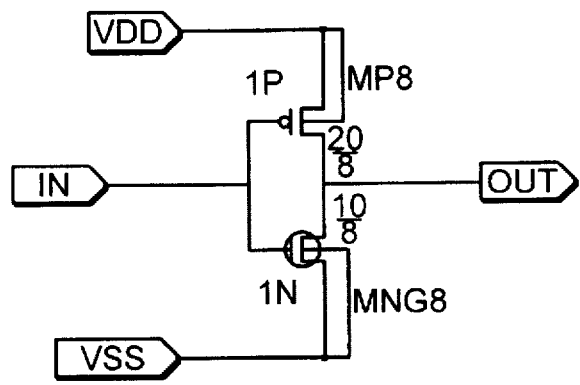
Figure 5U:
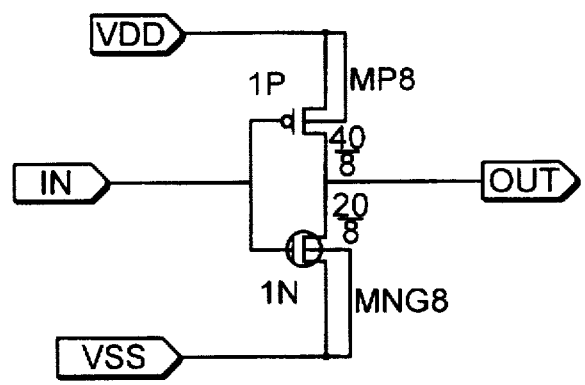
Figure 5V:
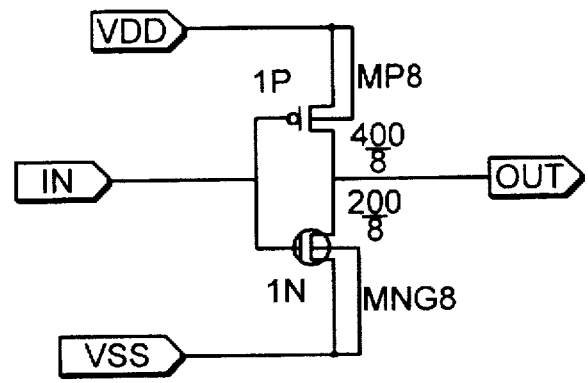
Figure 5W:
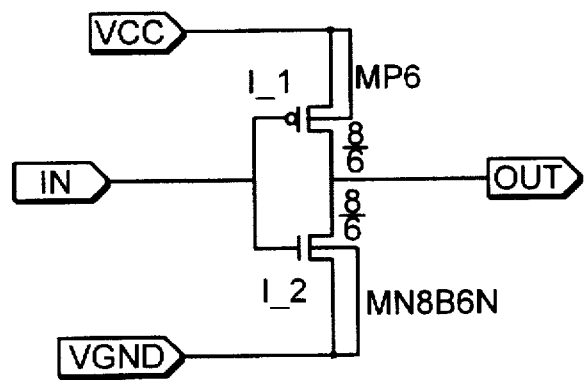
Figure 5X:
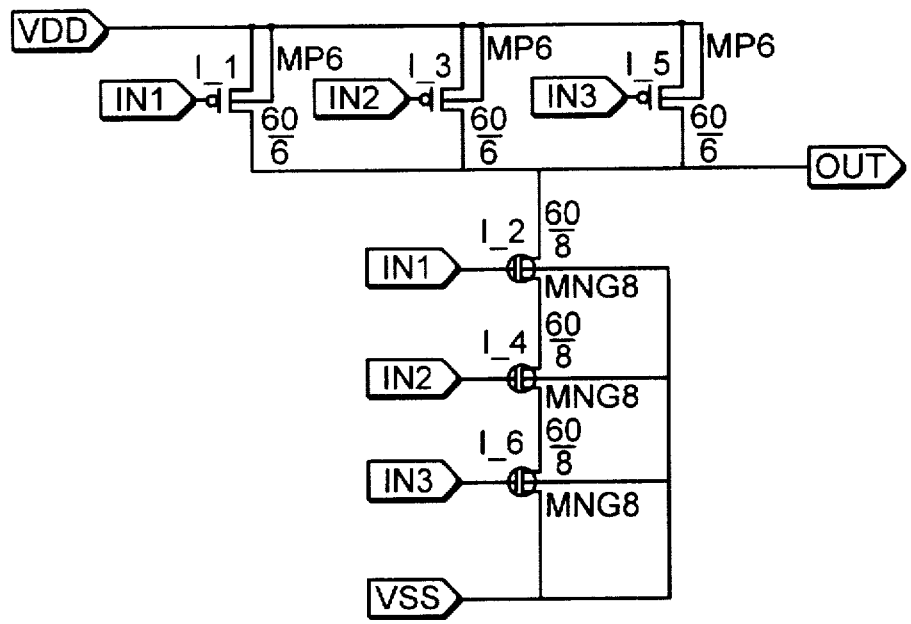
Figure 5Y:
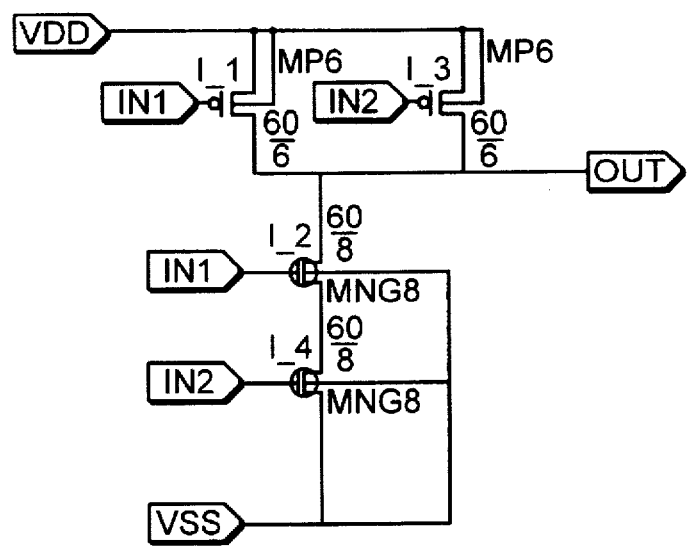
Figure 5Z:
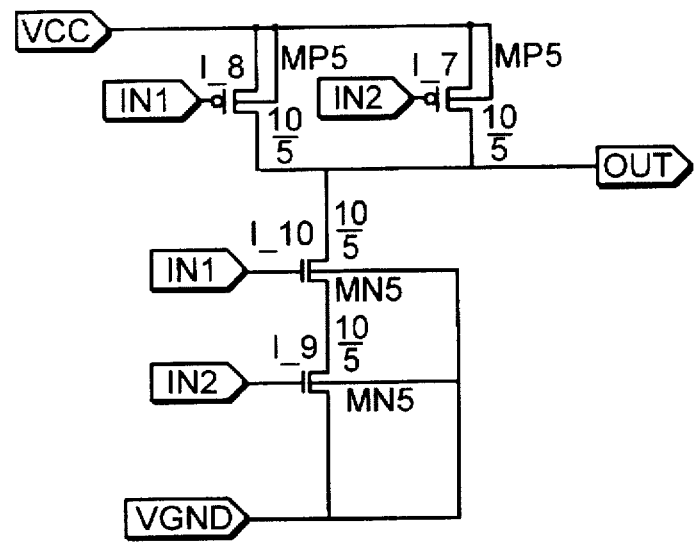
Figure 5A:
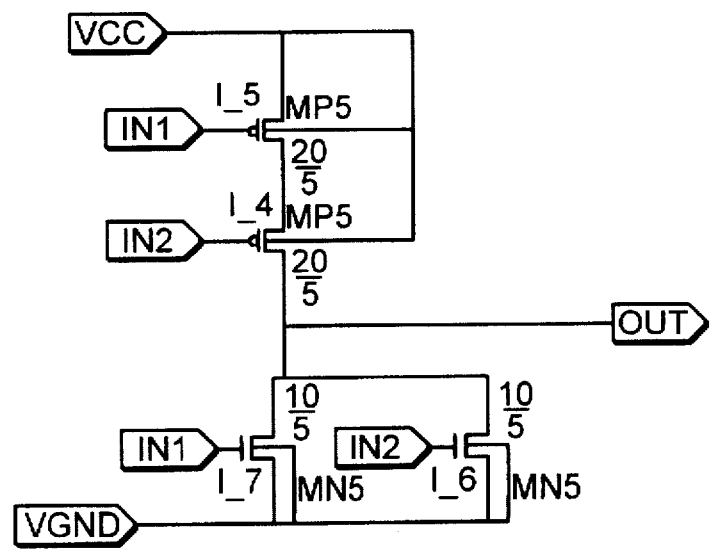
Figure 5B:
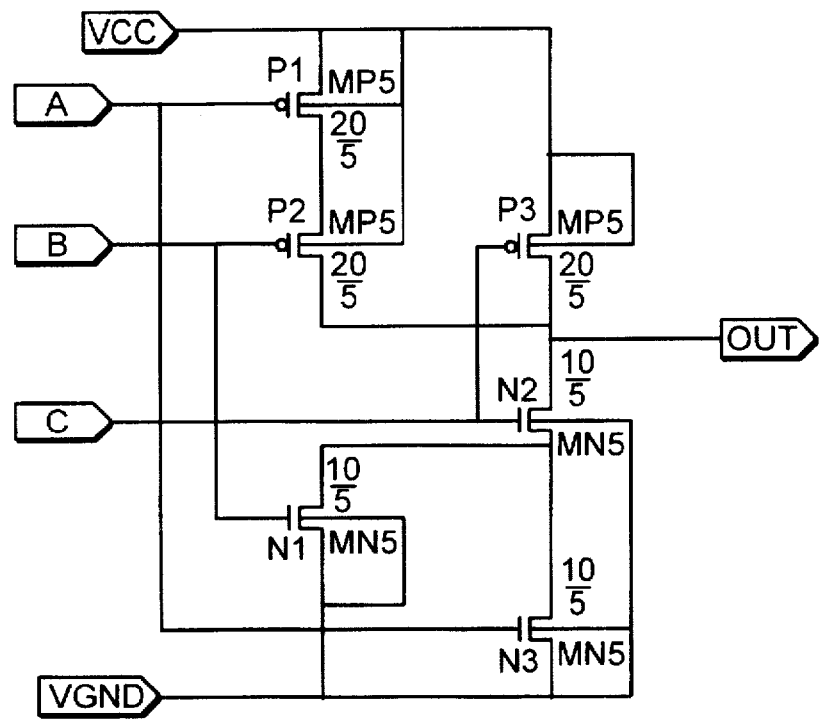
Figure 5C:
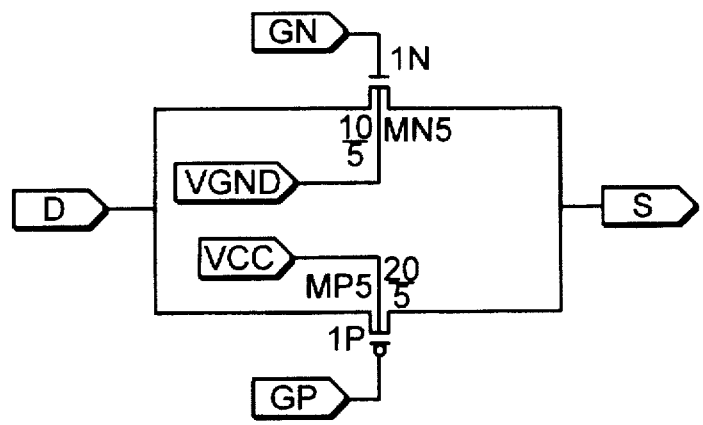

FIGS. 5a-5cc comprise the schematic and timing diagrams for a preferred embodiment of the programmable charge pump of FIG. 1.

Referring now to FIG. 5d, The frequency controller 21 includes a voltage divider 30 having resistors 32, 34. A FET transistor 36 is connected to resistor 34 at the transistor's source. The transistor's drain is connected to VGND and the gate is connected to a voltage level select signal SDB. Operation of the voltage divider 30 thus varies according to whether or not transistor 36 is on. When the transistor 36 is on, resistor 34 is connected to ground since the transistor 36 has a low on resistance. When the FET transistor 36 is off, resistor 34 is connected to VGND through the relatively high internal resistance of the transistor 36. In this way, the output of the voltage divider 30 at node 35 changes in response to the SDB signal 36 and in response to the voltage being supplied by the charge pump 1.

The divided down voltage at node 35 controls the gates of the two p-channel MOSFET transistors 40, 42 and two n-channel MOSFET transistors 46, 48 which form a hysteresis generator and level detector 38. When $V_{DD}$ falls below a predetermined value, the divided down voltage at node 35 causes the p-channel MOSFET transistors 40, 42 to become more conductive and the n-channel MOSFET transistors 46, 48 to turn off. This results in nodal point 52 being connected to $V_{CC}$. The voltage of the nodal point 52 then rises to approximately $V_{CC}$. Conversely, when $V_{DD}$ rises above a predetermined value, the divided down voltage rises and causes the p-channel MOSFET transistors 40, 42 to become less conductive and the n-channel MOSFET transistors 46, 48 to turn on. This connects nodal point 52 to ground.

To prevent the frequency controller 21 from hunting about $V_{DD}$, voltage hysteresis is introduced into the circuit by the combination of p-channel MOSFET transistor 44 and n-channel MOSFET transistor 50. The amount of off-voltage hysteresis, which prevents the frequency controller 21 from causing the oscillator 23 (FIG. 1) to switch to high frequency immediately as $V_{DD}$ falls below the predetermined voltage, is set by the ratio of p-channel MOSFET transistor 44 and p-channel MOSFET transistor 40. Similarly, the amount of on-voltage hysteresis, which prevents the frequency controller 21 from causing the oscillator 23 to switch immediately to low frequency as $V_{DD}$ rises above the predetermined voltage, is determined by the ratio of n-channel MOSFET transistor 50 and n-channel MOSFET transistor 48.

The voltage at nodal point 52 is an input voltage to an inverter 54 whose output 56 is both the NOT-high-frequency-enable signal (ENHIFB) and the input signal to a second inverter 58. The output 60 of the second inverter 58 is the high-frequency-enable signal (ENHIF). The NOT-high-frequency-enable signal and the high-frequency-enable signal control the gates of FET transistors 63 and 65 (FIG. 5i and FIG. 5j), respectively.

Turning to FIG. 5c, the ENHIF output 60 is ORed with the output of VSSDET to form a signal output 59. VSSDET is illustrated in greater detail in FIG. 5e, FIG. 5f, and FIG. 5g. In particular, $V_{SS}$ is used to form a bias signal which is inputted to a comparator 61 to provide the output of VSS-DET. The signal output 60 is provided to the oscillator 23.

As shown in FIG. 5h, the oscillator 23 receives the output 60 of the frequency controller 21. The oscillator 23 includes a network 64 which controls the rate of charging and discharging of capacitor 66. The network 64 includes two subnetworks 68, 70, which are illustrated in FIGS. 5i, 5j, respectively. Referring now to FIGS. 5h, 5i, 5j, a CLK/LF_GATE signal 62 from the output terminal of the oscillator 23 controls the network so as to permit capacitor 66 to charge and discharge. FET transistors 67 and 72 are p-channel devices and FET transistors 69, 74 are n-channel devices. When the signal 62 is at ground, FET transistors 72 (FIG. 5j) are on, connecting capacitor 66 to $V_{CC}$, and permitting capacitor 66 to charge to $V_{CC}$. Under the same conditions, FET transistors 74 (FIG. 5i) are off, isolating the capacitor 66 from ground (VGND). The turning on of FET transistors 72 causes the CLK/LF_GATE signal 62 of the oscillator 23 to go to high.

The output signal 62 turns off FET transistors 72 and turns on FET transistors 74 when high. The turning off of FET transistors 72 isolates the capacitor 66 from $V_{CC}$, while the turning on of FET transistors 74 connects the capacitor 66 to ground, causing it to discharge. The discharge of capacitor 66 causes the signal 62 to go to logic zero, thereby allowing for a repeating cycle. The rate at which the cycle repeats, and hence the oscillation frequency, is determined by capacitance of the capacitor 66 and the drain-source resistances of the parallel charging FET transistors 72 and the parallel discharging transistors 74.

FET transistors 63, whose gates are connected to the high-frequency-enable output 60 of the second inverter 58, provide a second pathway, from the capacitor 66 through FET transistors 69 to ground. Likewise, FET transistors 65, whose gates are connected to the NOT-high-frequency-enable output 56 of the first inverter 54, provide a second pathway, from the capacitor 66 through FET transistors 67 to $V_{CC}$.

When the controller 21 detects a low $V_{DD}$ and enables high frequency operation of the oscillator 23, the NOT-high-frequency-enable signal 56 applied to the gates of FET transistors 65, and the high-frequency-enable signal 60 applied to the gates of FET transistors 63, turn on FET transistors 65 and 63, respectively. With FET transistor 65 on, a second, lower resistance path is available from the capacitor 66 to $V_{CC}$. Thus, when FET transistors 67, 72 turn on as previously described, the capacitor 66 is charged more quickly than when only charged through FET transistors 72.

When FET transistors 63 are on, a second, lower resistance path is available from the capacitor 66 to ground. When FET transistors 69, 74 turn on as previously described, the capacitor 66 is discharged more quickly than when only discharged through FET transistors 74. The combination of more rapid charging and discharging allows production of a higher frequency oscillation.

It should be understood that the invention is not limited to the particular embodiment shown and described herein, and that various changes and modifications may be made without departing from the spirit and scope of this novel concept as defined by the following claims. For example, modifications for providing a programmable charge pump with voltage outputs other than ±5 Volts and ±10 Volts will be quite apparent to those skilled in the art in light of the present disclosure.

What is claimed is:

1. A programmable charge pump comprising:

a first reference input port;

a second reference input port;

a first output port;

a second output port;

a plurality of charge capacitors;

a plurality of storage capacitors, each of said plurality of storage capacitors comprising
 a first terminal electrically coupled to a respective one of said first and second output ports; and
 a second terminal electrically coupled to a respective one of said first and second reference input ports; and a plurality of switches, each of said plurality of switches having a control terminal, said plurality of switches selectively coupling ones of said plurality of charge capacitors to said first reference input port, said second reference input port and to other respective charge capacitors in said plurality of charge capacitors, said plurality of switches further selectively coupling said first terminal of each of plurality of storage capacitors to at least a respective one of said plurality of charge capacitors;

wherein said plurality of switches provides a respective one of a plurality of possible bipolar output voltages at said first and second output ports in response to a respective control signal applied to the control terminal of each of said plurality of switches.

2. The programmable charge pump of claim 1 further comprising:

a selection signal input port; and pump configuration circuitry electrically coupled to said selection signal input port and to the control terminal of each of said plurality of switches, said pump configuration circuitry providing the respective control signals to said plurality of switches in response to a selection signal received on said selection signal input port.

3. The programmable charge pump of claim 2 wherein said plurality of charge capacitors includes first and second charge capacitors (C1, C2), and said plurality of storage capacitors includes first and second storage capacitors (C3, C4).

4. The programmable charge pump of claim 3 wherein said first reference input port receives a supply voltage ($V_{CC}$) and said second reference input port is electrically coupling to ground (GND).

5. The programmable charge pump of claim 4 wherein said pump configuration circuitry controls said plurality of switches in a first phase to charge C3 with C1 and to charge C2 between $V_{CC}$ and GND, and further controls said plurality of switches in a second phase to charge C3 with C2 and to charge C1 between $V_{CC}$ and GND.

6. The programmable charge pump of claim 5 wherein said pump configuration circuitry controls said plurality of switches according to a modified four phase timing clock control in which the first and second phases are repeated.

7. The programmable charge pump of claim 6 wherein one of the plurality of possible bipolar output voltages is ±5 Volts.

8. The programmable charge pump of claim 4 wherein said pump configuration circuitry controls said plurality of switches in a first phase to employ C1 to charge C2, in a second phase to charge C1 between $V_{CC}$ and GND while employing C2 to charge C3, in a third phase to employ C1 to charge C2, and in a fourth phase to charge C1 between $V_{CC}$ and GND while employing C2 to charge C4.

9. The programmable charge pump of claim 8 wherein said pump configuration circuitry controls said plurality of switches in the four phases according to a four phase timing clock control.

10. The programmable charge pump of claim 9 wherein one of the plurality of possible bipolar output voltages is ±10 Volts.

11. The programmable charge pump of claim 9 further comprising:
   timing control circuitry in electrical communication with said plurality of switches, said timing control circuitry providing the four phase timing clock control; and
   a power management circuit in electrical communication with said timing control circuitry, said power management circuit being operative to increase charge pump operating frequency in response to a decrease in one or more output voltages at said first and second output ports below a first predetermined voltage, and operative to decrease the charge pump operating frequency in response to an increase in one or more of the output voltages at said first and second output ports above a second predetermined voltage.

12. A programmable charge pump comprising:
   a first reference input port;
   a second reference input port;
   a first output port;
   a second output port;
   a first charge capacitor having a relatively positive terminal (C1+) and a relatively negative terminal (C1−);
   a second charge capacitor having a relatively positive terminal (C2+) and a relatively negative terminal (C2−);
   a first storage capacitor having a relatively positive terminal (C3+) electrically coupled to said second reference input port and a relatively negative terminal (C3−) electrically coupled to said second output port;
   a second storage capacitor having a relatively negative terminal (C4−) electrically coupled to said first reference input port and a relatively positive terminal (C4+) electrically coupled to said first output port;
   a plurality of switches, each of said plurality of switches having a control terminal, said plurality of switches selectively coupling C4+ to said second charge capacitor, selectively coupling C3− to one of said first and second charge capacitors, and selectively coupling said first and second charge capacitors to said first reference input port, said second reference input port and to each other;
      wherein said plurality of switches is adapted to operate in said first and second modes as determined by a respective control signal applied to the control terminal of each of said plurality of switches to provide a respective one of first and second bipolar output voltages at said first and second output ports.

13. The programmable charge pump of claim 12 further comprising:
   a selection signal input port; and
   pump configuration circuitry electrically coupled to said selection signal input port and to each of said plurality of switches, said pump configuration circuitry providing the respective control signals to said plurality of switches in response to a selection signal received on said selection signal input port.

14. The programmable charge pump of claim 13 wherein said plurality of switches and said pump configuration circuitry are located on a single integrated circuit.

15. The programmable charge pump of claim 14 wherein said first and second charge capacitors and said first and second storage capacitors are external to said integrated circuit.

16. The programmable charge pump of claim 13 wherein said first reference input port receives a supply voltage ($V_{CC}$) and said second reference input port is electrically coupled to ground (GND).

17. The programmable charge pump of claim 16 wherein the first mode is ±5 Volt operation.

18. The programmable charge pump of claim 17 wherein the ±5 Volt mode includes first and second phases, the first phase including electrically coupling C1+ to GND, electrically coupling C1− to C3−, electrically coupling C2+ to $V_{CC}$, electrically coupling C2− to GND, and electrically coupling C3+ to GND; the second phase including electrically coupling C1+ to $V_{CC}$, electrically coupling C1− to GND, electrically coupling C2− to C3−, and electrically coupling C3+ to GND.

19. The programmable charge pump of claim 16 wherein the second mode is ±10 Volt operation.

20. The programmable charge pump of claim 19 wherein the ±10 Volt mode includes first, second, third and fourth phases, the first phase including electrically coupling C1+ to GND, electrically coupling C1− to C2−, and electrically coupling C2+ to $V_{CC}$; the second phase including electrically coupling C1+ to $V_{CC}$, electrically coupling C1− to GND, electrically coupling C2+ to GND, electrically coupling C2− to C3−, and electrically coupling C3+ to GND; the third phase including electrically coupling C1+ to GND, electrically coupling C1− to C2−, and electrically coupling C2+ to $V_{CC}$; and the fourth phase including electrically coupling C1+ to $V_{CC}$, electrically coupling C1− to GND, electrically coupling C2+ C4+, and electrically coupling C2− to GND.

21. The programmable charge pump of claim 20 further comprising:
   timing control circuitry in electrical communication with said plurality of switches, said timing control circuitry providing four phase time clock control; and
   a power management circuit in electrical communication with said timing control circuitry, said power management circuit being operative to increase charge pump operating frequency in response to a decrease in one or more output voltages at said first and second output ports below a first predetermined voltage, and operative to decrease the charge pump operating frequency in response to an increase in one or more of the output voltages at said first and second output port above a second predetermined voltage.

22. A method of providing a selected bipolar voltage with first and second storage capacitors, first and second charge capacitors, a voltage supply, a ground, and switches, the method comprising the steps of:
   generating a first bipolar voltage with respect to a first output voltage port and a second output voltage port in response to a first input signal by operating the switches in first and second phases including:
      operating the switches in the first phase to cause charging of the first storage capacitor with the first charge capacitor, and charging of the second charge capacitor between the supply and the ground; and
      operating the switches in the second phase to cause charging of the first storage capacitor by the second charge capacitor, and charging of the first charge capacitor between the supply and the ground; and
   generating a second bipolar voltage with respect to the first output voltage port and the second output voltage port in response to a second input signal by operating the switches in first, second, third and fourth phases including:
  operating the switches in the first phase to employ the first charge capacitor to charge the second charge capacitor;
  operating the switches in the second phase to cause charging of the first charge capacitor between the supply and the ground, and transferring of charge from the second charge capacitor to the first storage capacitor;
  operating the switches in the third phase to employ the first charge capacitor to charge the second charge capacitor; and
  operating the switches in the fourth phase to cause charging of the first charge capacitor between the supply and the ground, and employing the second charge capacitor to charge the second storage capacitor.

23. The method of claim 22 further comprising the steps of:
  increasing a frequency at which the switches transition between phases as one or more output voltages at the first and second output voltage ports decreases below a first predetermined voltage level; and
  decreasing the frequency at which the switches transition between the phases as one or more of the output voltages at the first and second output voltage ports increases above a second predetermined voltage level.

24. A charge pump for providing a selected one of a plurality of possible bipolar output voltages from a single supply voltage $V_{CC}$, comprising:
  a supply voltage input port;
  a reference voltage input port;
  a first output port;
  a second output port;
  a plurality of capacitors, a first one of said plurality of capacitors being electrically coupled to said first output port, and a second one of said plurality of capacitors being electrically coupled to said second output port;
  a plurality of electronic switches having a conductive state and non-conductive state, each of said plurality of electronic switches having a control terminal, said plurality of switches selectively coupling ones of said plurality of capacitors to said supply voltage input port, said reference voltage input port, and to other respective capacitors in said plurality of capacitors;
  a phase generator in electrical communication said plurality of electronic switches, said phase generator providing a plurality of phase signals; and
  a switch configuration circuit electrically coupled to the control terminal of each of said plurality of switches, said switch configuration circuit being responsive to a first input signal having at least a first input state and a second input state and the plurality of phase signals to selectively cause selected ones of said plurality of electronic switches to assume the conductive state during selected phases so as to selectively interconnect said supply voltage input port, selected ones of said plurality of capacitors, and said reference voltage input port to provide a first bipolar output voltage at said first and second output ports when the first input signal is in the first input state and to provide a second bipolar output voltage at said first and second output ports when the first input signal is in the second input state, the second bipolar output voltage being different from the first bipolar output voltage.

25. The charge pump of claim 24 wherein the first bipolar output voltage is approximately equal to $+V_{CC}$ and $-V_{CC}$ and the second bipolar output voltage is approximately equal to $+2V_{CC}$ and $-2V_{CC}$.

26. The charge pump claim 25 further comprising:
  a power management circuit in electrical communication with said phase generator, said power management circuit being operative to increase charge pump operating frequency in response to a decrease in one or more output voltages at said first and second output ports below a first predetermined voltage, and operative to decrease the charge pump operating frequency in response to an increase in one or more of the output voltages at said first and second output ports above a second predetermined voltage.

27. A programmable charge pump for providing one of a plurality of possible bipolar output voltages, comprising:
  a plurality of charge capacitors in selective communication with a supply voltage, a first storage capacitor, and a second storage capacitor, wherein said plurality of charge capacitors are employed to generate a first voltage on said first storage capacitor and a second voltage on said second storage capacitor, said first and second storage capacitors thereby providing a respective one of a plurality of possible bipolar output voltages in response to a control signal.

* * * * *